US010304002B2

(12) United States Patent
Brunner

(10) Patent No.: US 10,304,002 B2
(45) Date of Patent: May 28, 2019

(54) DEPTH-BASED FEATURE SYSTEMS FOR CLASSIFICATION APPLICATIONS

(71) Applicant: YouSpace, Inc., Mountain View, CA (US)

(72) Inventor: Ralph Brunner, Cupertino, CA (US)

(73) Assignee: YouSpace, Inc., Santa Clara, CA (US)

( * ) Notice: Subject to any disclaimer, the term of this patent is extended or adjusted under 35 U.S.C. 154(b) by 638 days.

(21) Appl. No.: 15/018,303

(22) Filed: Feb. 8, 2016

(65) Prior Publication Data

US 2017/0228647 A1     Aug. 10, 2017

(51) Int. Cl.

| | | |
|---|---|---|
| *G06N 7/00* | (2006.01) | |
| *G06N 5/02* | (2006.01) | |
| *G06F 3/01* | (2006.01) | |
| *G06F 3/03* | (2006.01) | |
| *G06K 9/00* | (2006.01) | |
| *G06K 9/50* | (2006.01) | |

(52) U.S. Cl.
CPC ............ *G06N 7/005* (2013.01); *G06F 3/017* (2013.01); *G06F 3/0304* (2013.01); *G06N 5/025* (2013.01); *G06K 9/00201* (2013.01); *G06K 9/00362* (2013.01); *G06K 9/50* (2013.01)

(58) Field of Classification Search
CPC ....... G06F 17/10; G06F 3/00; G06K 9/00201; G06K 9/00362; G06K 9/50; G06N 5/02; G06N 5/025; G06N 7/005
See application file for complete search history.

(56) References Cited

U.S. PATENT DOCUMENTS

| 5,534,917 A | 7/1996 | MacDougall |
|---|---|---|
| 7,058,204 B2 | 6/2006 | Hildreth et al. |
| | (Continued) | |

FOREIGN PATENT DOCUMENTS

| WO | WO2015195652 | 12/2015 |
|---|---|---|
| WO | WO2014100250 | 6/2017 |

OTHER PUBLICATIONS

Li et al., "Action recognition based on a bag of 3D points", Jun. 13-18, 2010, 2010 IEEE Computer Society Conference on Computer Vision and Pattern Recognition—Workshops, CVPRW 2010, pp. 9-14 (Year: 2010).*

(Continued)

*Primary Examiner* — Eric Nilsson
*Assistant Examiner* — Brent Johnston Hoover

(57) ABSTRACT

Human Computer Interfaces (HCI) may allow a user to interact with a computer via a variety of mechanisms, such as hand, head, and body gestures. Various of the disclosed embodiments allow information captured from a depth camera on an HCI system to be used to recognize such gestures. Particularly, the HCI system's depth sensor may capture depth frames of the user's movements over time. To discern gestures from these movements, the system may group portions of the user's anatomy represented by the depth data into classes. "Features" which reflect distinguishing features of the user's anatomy may be used to accomplish this classification. Some embodiments provide improved systems and methods for generating and/or selecting these features. Features prepared by various of the disclosed embodiments may be less susceptible to overfitting training data and may more quickly distinguish portions of the user's anatomy.

20 Claims, 21 Drawing Sheets

(56) References Cited

U.S. PATENT DOCUMENTS

| | | | |
|---|---|---|---|
| 7,227,526 | B2 | 6/2007 | Hildreth et al. |
| 8,208,719 | B2 | 6/2012 | Gordon et al. |
| 9,323,338 | B2 | 4/2016 | He et al. |
| 2010/0074523 | A1* | 3/2010 | Ishiga ............... G06K 9/00684 382/170 |
| 2014/0225977 | A1 | 8/2014 | Vilcovsky et al. |
| 2014/0226000 | A1 | 8/2014 | Vilcovsky et al. |
| 2014/0226900 | A1 | 8/2014 | Saban et al. |
| 2016/0048726 | A1* | 2/2016 | Tang ............... G06K 9/00355 382/103 |
| 2016/0127710 | A1 | 5/2016 | Saban et al. |
| 2017/0161592 | A1 | 6/2017 | English et al. |
| 2017/0161607 | A1 | 6/2017 | English et al. |

OTHER PUBLICATIONS

Ren, Shaoqing, et al. "Global refinement of random forest." 2015. Available at http://www.cv-foundation.org/openaccess/content_cvpr 2015/papers/Ren_Global_Refinement_of 2015_CVPR_paper. pdf. (Retrieved on Feb. 8, 2017).
Chih-Chung Chang, et al., LIBSVM: A Library for Support Vector Machines. 2011. Available at http://www.csie.ntu.edu.tw/~cjlin/papers/libsvm.pdf. (Retrieved Feb. 8, 2017).
Dong Chen, et al., Blessing of Dimensionality: High-dimensional Feature and Its Efficient Compression for Face Verification. 2013. Available at http://jiansun.org/papers/CVPR13_HighDim.pdf. (Retrieved Feb. 8, 2017).
Simon Bernard, et al., Dynamic Random Forests. 2012. Available at https://hal.archives-ouvertes.fr/hal-00710083/document. (Retrieved Feb. 8, 2017).
Simon Bernard, et al., Forest-RK: A New Random Forest Induction Method. 2009. Available at https://hal.archives-ouvertes.fr/hal-00436367/document. (Retrieved Feb. 8, 2017).
Juergen Gall, et al., Class-Specific Hough Forests for Object Detection. 2009. Available at http://projectsweb.cs.washington.edu/research/insects/CVPR2009/objdetrec/hughforest_objdetect.pdf. (Retrieved Feb. 8, 2017).
Manish Mehta, et al., MDL-based Decision Tree Pruning. 1995. Available at https://www.aaai.org/Papers/KDD/1995/KDD95-025. pdf. (Retrieved Feb. 8, 2017).
Rong-En Fan, et al., Liblinear: A Library for Large Linear Classification. 2008. Available at http://www.csie.ntu.edu.tw/~cjlin/papers/liblinear. pdf. (Retrieved Feb. 8, 2017).
Y. Amit and D. Geman, Shape quantization and recognition with randomized trees. 1996. Available at http://www.wisdom.weizmann. ac.il/~vision/courses/2003_2/shape.pdf. (Retrieved Feb. 23, 2017).
J. R. Quinlan, Induction of decision trees. 1986. Available at http://hunch.net/~coms-4771/quinlan.pdf. (Retrieved Feb. 23, 2017).
B. A. Shepherd, An appraisal of a decision tree approach to image classification. 1983. Available at https://pdfs.semanticscholar.org/98e4/5102842acb101d66dc53dc898877d34a54b8.pdf. (Retrieved Feb. 23, 2017).
K. K. Biswas et al., "Gesture Recognition Using Microsoft Kinect®". 2011. Available at http://ai2-s2-pdfs.s3.amazonaws.com/92b4/c8655484b603e33aea87e9Oba598989ce069.pdf (Retrieved Jul. 5, 2017).
International Search Report & Written Opinion, PCT/US2017/027449; dated Jun. 27, 2017; 24 Pages.
LIBSVM Tools, https://www.csie.ntu.edu.tw/~cjlin/libsvmtools/. (Retrieved Feb. 6, 2017).
Liblinear—A Library for Large Linear Classification. https://www.csie.ntu.edu.tw/~cjlin/liblinear/. (Retrieved Feb. 6, 2017).
Ren, Shaoqing, et al. "Global refinement of random forest." available at http://www.cv-foundation.org/openaccess/content_cvpr_2015/papers/Ren_Global_Refinement_of 2015_CVPR_paper.pdf. (Retrieved on Feb. 8, 2017).
Leo Breiman, Random Forests. 2001. Available at https://www.statberkeley.edu/~breiman/randomforest2001.pdf. (Retrieved Feb. 8, 2017).
Chih-Chung Chang, et al., LIBSVM: A Library for Support Vector Machines. Available at http://www.csie.ntu.edu.tw/~cjlin/papers/libsvm.pdf. (Retrieved Feb. 8, 2017).
Dong Chen, et al., Blessing of Dimensionality: High-dimensional Feature and Its Efficient Compression for Face Verification. Available at http://jiansun.org/papers/CVPR13_HighDim.pdf. (Retrieved Feb. 8, 2017).
Simon Bernard, et al., Dynamic Random Forests. Available at https://hal.archives-ouvertes.fr/hal-00710083/document. (Retrieved Feb. 8, 2017).
Simon Bernard, et al., Forest-RK: A New Random Forest Induction Method. Available at https://hal.archives-ouvertes.fr/hal-00436367/document. (Retrieved Feb. 8, 2017).
Juergen Gall, et al., Class-Specific Hough Forests for Object Detection. http://projectsweb.cs.washington.edu/research/insects/CVPR2009/objdetrec/hughforest_objdetect.pdf. (Retrieved Feb. 8, 2017).
Manish Mehta, et al., MDL-based Decision Tree Pruning. Available at https://www.aaai.org/Papers/KDD/1995/KDD95-025.pdf. (Retrieved Feb. 8, 2017).
Rong-En Fan, et al., LIBLINEAR: A Library for Large Linear Classification. http://www.csie.ntu.edu.tw/~cjlin/papers/liblinear. pdf. (Retrieved Feb. 8, 2017).
Y. Amit and D. Geman, Shape quantization and recognition with randomized trees. http://www.wisdom.weizmann.ac.il/~vision/courses/2003_2/shape.pdf. (Retrieved Feb. 23, 2017).
J. R. Quinlan, Induction of decision trees. http://hunch.net/~coms-4771/quinlan.pdf. (Retrieved Feb. 23, 2017).
B. A. Shepherd, an appraisal of a decision tree approach to image classification. https://pdfs.semanticscholar.org/98e4/5102842acb101d66dc53dc898877d34a54b8.pdf. (Retrieved Feb. 23, 2017).
Jamie Shotton, et al., Real-Time Human Pose Recognition in Parts from Single Depth Images, Proceedings of CVPR, Jun. 2011, IEEE, United States.
Jamie Shotton, et al., Efficient Human Pose Estimation from Single Depth Images, Trans. PAMI, 2012, IEEE, United States.
Gestigon GMBH, Oyster Advanced Body Skeleton Tracking—YouTube, Published Jun. 6, 2016. Available at https://www.youtube.com/watch?v=UiEg64H07Gk&feature=youtu.be. (Retrieved Sep. 6, 2017).
Stone, A et al, Teaching Compositionality to CNNs, (Submitted on Jun. 14, 2017), acquired Sep. 8, 2017 from https://arxiv.org/abs/1706.04313.
Kansky. K et al, Schema Networks: Zero-shot Transfer with a Generative Causal Model of Intuitive Physics, (Submitted on Jun. 14, 2017), acquired Sep. 8, 2017 from https://arxiv.org/abs/1706.04317.
Vicarious, Vicarious | Blog website. Available at https://www.vicarious.com/general-game-playing-with-schema-networks.html. (Retrieved Sep. 6, 2017).
Vicarious, Vicarious | Home | AI for the robot age—website. Available at https://www.vicarious.com/. (Retrieved Sep. 6, 2017).

* cited by examiner

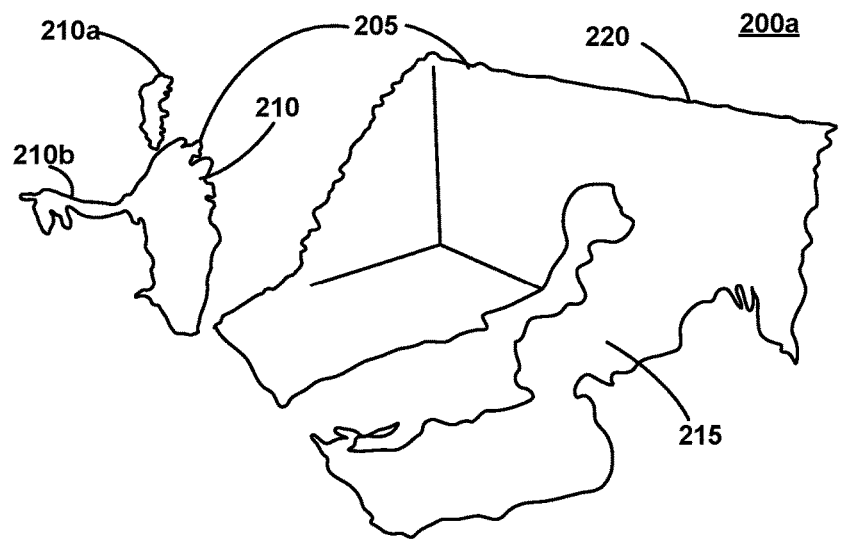
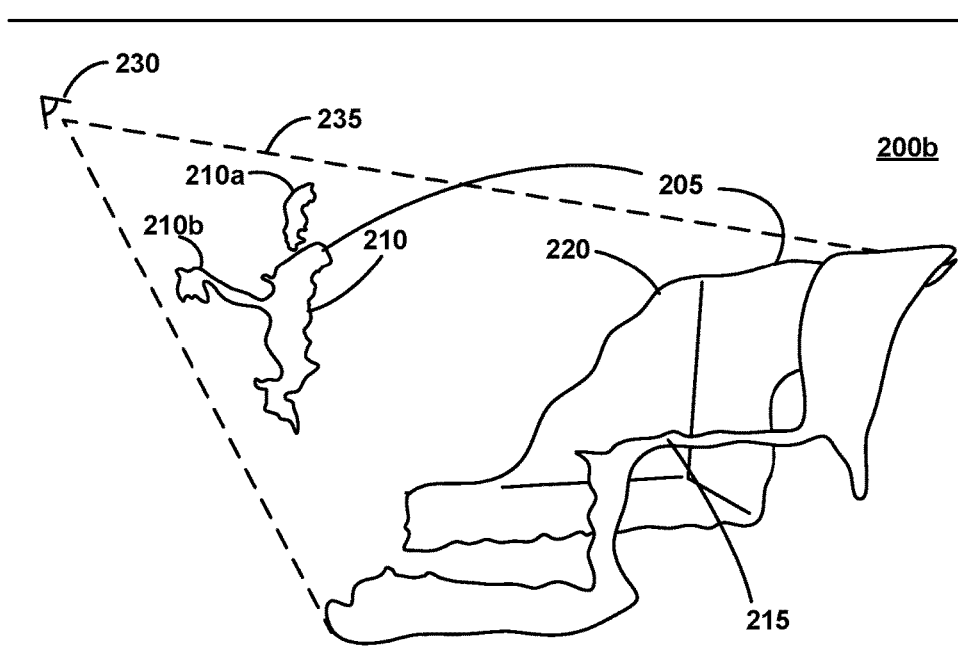
FIG. 2

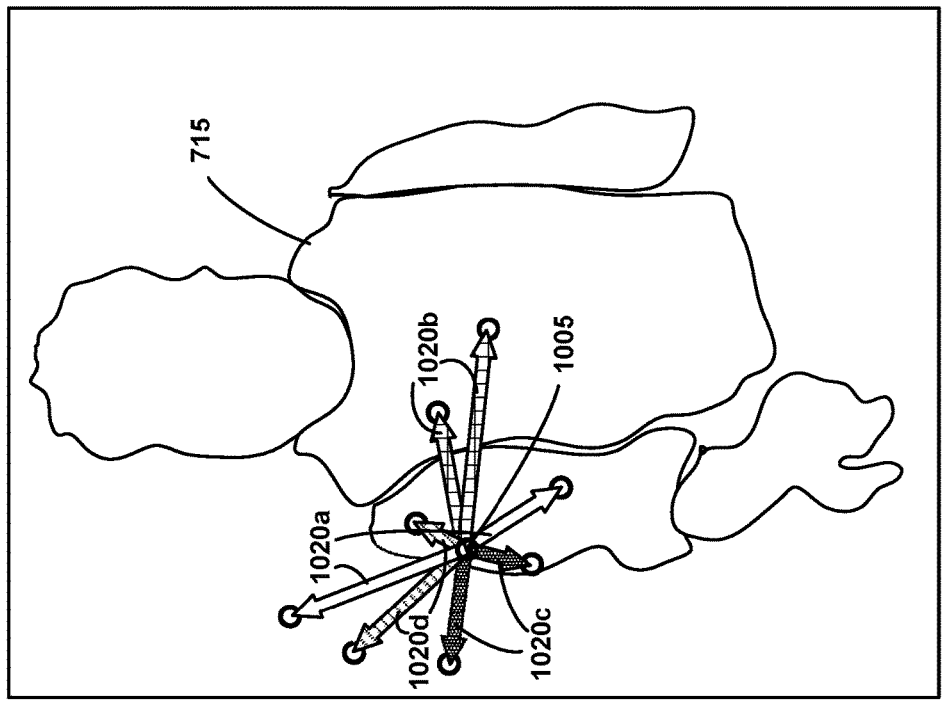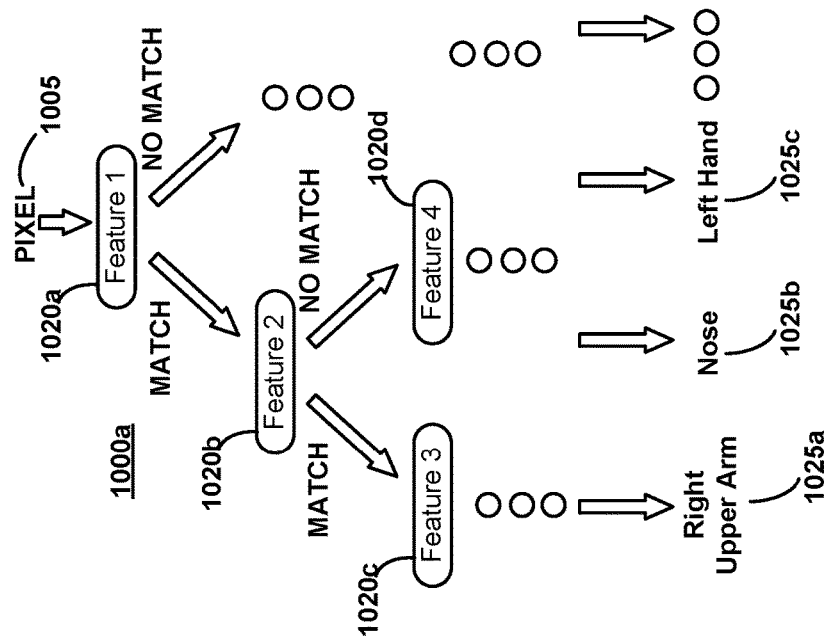
FIG. 10

DEPTH-BASED FEATURE SYSTEMS FOR CLASSIFICATION APPLICATIONS

BACKGROUND

Human-computer interaction (HCI) systems are becoming increasingly prevalent in our society. With this increasing prevalence has come an evolution in the nature of such interactions. Punch cards have been surpassed by keyboards, which were themselves complemented by mice, which are themselves now complemented by touch screen displays, etc. Various machine vision approaches may even now facilitate visual, rather than the mechanical, user feedback. Machine vision allows computers to interpret images from their environment to, e.g., recognize users' faces and gestures. Some machine vision systems rely upon grayscale or RGB images of their surroundings to infer user behavior. Some machine vision systems may also use depth-based sensors, or rely exclusively upon depth based sensors, to recognize user behavior (e.g., the Microsoft Kinect™, Intel RealSense™, Apple PrimeSense™, Structure Sensor™ Velodyne HDL-32E LiDAR™, Orbbec Astra™, etc.).

While depth-based approaches to HCI remove certain problems common to optical systems (e.g., problematic lighting, shadows, user discoloration, etc.) depth-based approaches to HCI may also introduce their own obstacles and complexities that need to be addressed. Many depth-based systems may be located within a house, office, or other environment having dynamic and static qualities. Creating devices and observation platforms which process and interpret data from these environments to extract meaningful data remains quite challenging. Particularly, there is a need to integrate design conditions with mechanical constraints and processing capabilities to achieve a successful user experience.

BRIEF DESCRIPTION OF THE DRAWINGS

Various of the embodiments introduced herein may be better understood by referring to the following Detailed Description in conjunction with the accompanying drawings, in which like reference numerals indicate identical or functionally similar elements:

FIG. 2 is a series of perspective and side views of example depth data as may be used in some embodiments;

FIG. 10 illustrates an example use of features to generate a classification tree as may occur in some embodiments;

Figure 1:
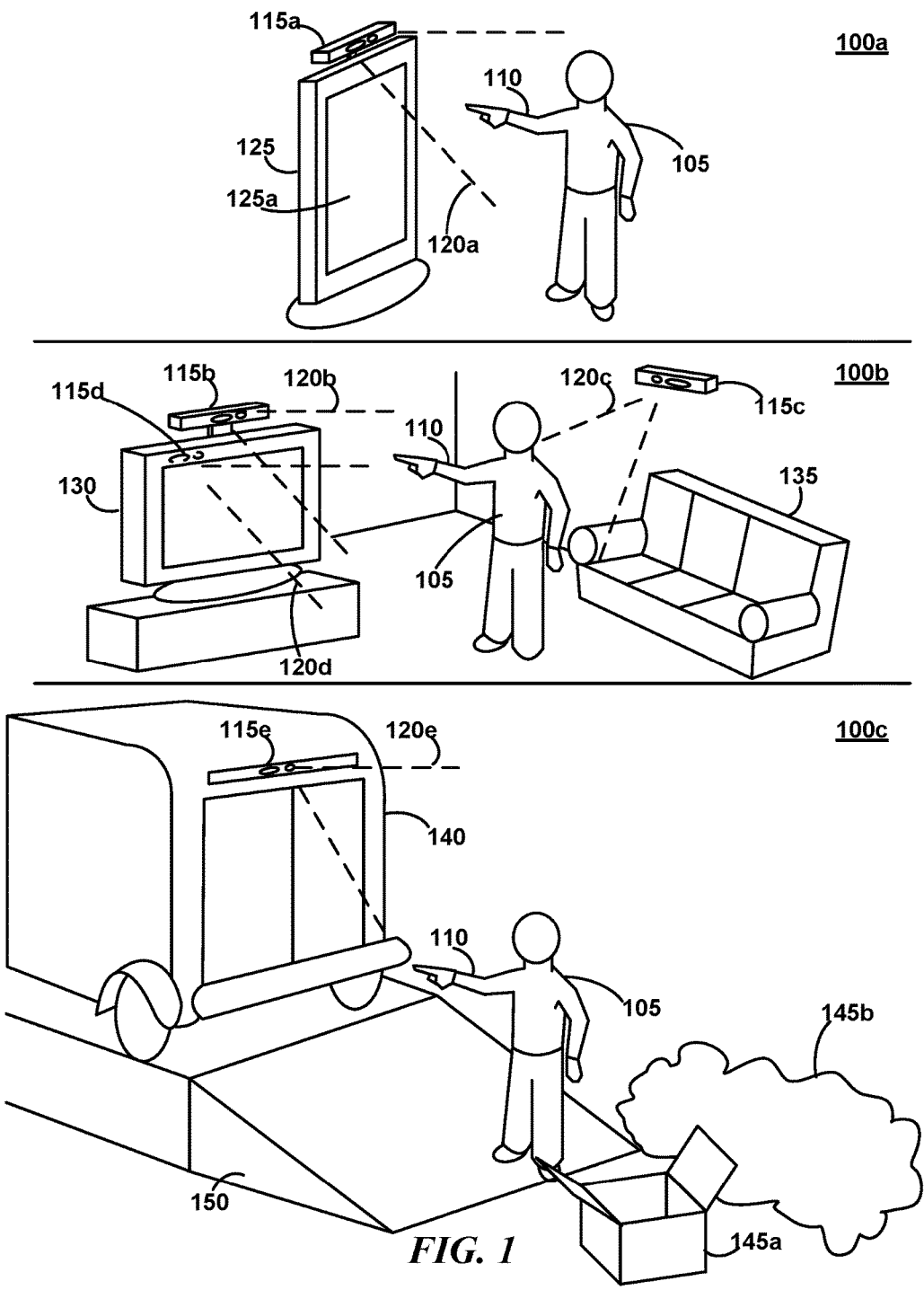
FIG. 1 is a series of use case diagrams illustrating various situations in which various of the disclosed embodiments may be implemented.

The specific examples depicted in the drawings have been selected to facilitate understanding. Consequently, the disclosed embodiments should not be restricted to the specific details in the drawings or the corresponding disclosure. For example, the drawings may not be drawn to scale, the dimensions of some elements in the figures may have been adjusted to facilitate understanding, and the operations of the embodiments associated with the flow diagrams may encompass additional, alternative, or fewer operations than those depicted here. Thus, some components and/or operations may be separated into different blocks or combined into a single block in a manner other than as depicted. The intention is not to limit the embodiments to the particular examples described or depicted. On the contrary, the embodiments are intended to cover all modifications, equivalents, and alternatives falling within the scope of the disclosed examples.

DETAILED DESCRIPTION

Example Use Case Overview

Various of the disclosed embodiments may be used in conjunction with a mounted or fixed depth camera system to detect, e.g. user gestures. FIG. 1 is a series of use case diagrams illustrating various situations 100a-c in which various of the disclosed embodiments may be implemented. In situation 100a, a user 105 is standing before a kiosk 125 which may include a graphical display 125a. Rather than requiring the user to physically touch items of interest on the display 125a the system may allow the user to "point" or "gesture" at the items and to thereby interact with the kiosk 125.

A depth sensor 115a may be mounted upon or connected to or near the kiosk 125 so that the depth sensor's 115a field of depth capture 120a encompasses gestures 110 made by the user 105. Thus, when the user points at, e.g., an icon on the display 125a by making a gesture within the field of depth data capture 120a the depth sensor 115a may provide the depth values to a processing system, which may infer the selected icon or operation to be performed. The processing system may be configured to perform various of the operations disclosed herein and may be specifically configured, or designed, for interfacing with a depth sensor (indeed, it may be embedded in the depth sensor) and outputting the processing system's results to specific hardware interface. The processing system may be located within the depth sensor 115a, within the kiosk 125, at a remote location, etc. The applications running on the kiosk 125 may simply receive an indication of the selected icon and may not be specifically designed to consider whether the selection was made via physical touch vs. depth based determinations of the selection. Thus, the depth sensor 115a and the processing system may be an independent product or device from the kiosk 125 in some embodiments.

In situation 100b, a user 105 is standing in a domestic environment which may include one or more depth sensors 115b, 115c, and 115d each with their own corresponding fields of depth capture 120b, 120c, and 120d respectively. Depth sensor 115b may be located on or near a television or other display 130. The depth sensor 115b may be used to capture gesture input from the user 105 and forward the depth data to an application running on or in conjunction with the display 130. For example, a gaming system, computer conferencing system, etc. may be run using display 130 and may be responsive to the user's 105 gesture inputs. In contrast, the depth sensor 115c may passively observe the user 105 as part of a separate gesture or behavior detection application. For example, a home automation system may respond to gestures made by the user 105 alone or in conjunction with various voice commands. In some embodiments, the depth sensors 115b and 115c may share their depth data with a single application to facilitate observation of the user 105 from multiple perspectives. Obstacles and non-user dynamic and static objects, e.g. couch 135, may be present in the environment and may or may not be included in the fields of depth capture 120b, 120c.

Note that while the depth sensor may be placed at a location visible to the user 105 (e.g., attached on top or mounted upon the side of televisions, kiosks, etc. as depicted, e.g., with sensors 115a-c) some depth sensors may be integrated within another object. Such an integrated sensor may be able to collect depth data without being readily visible to user 105. For example, depth sensor 115d may be integrated into television 130 behind a one-way mirror and used in lieu of sensor 115b to collect data. The one-way mirror may allow depth sensor 115d to collect data without the user 105 realizing that the data is being collected. This may allow the user to be less self-conscious in their movements and to behave more naturally during the interaction.

While the depth sensors 115a-d may be positioned parallel to a wall, or with depth fields at a direction orthogonal to a normal vector from the floor, this may not always be the case. Indeed, the depth sensors 115a-d may be positioned at a wide variety of angles, some of which place the fields of depth data capture 120a-d at angles oblique to the floor and/or wall. For example, depth sensor 115c may be positioned near the ceiling and be directed to look down at the user 105 on the floor.

This relation between the depth sensor and the floor may be extreme and dynamic in some situations. For example, in situation 100c a depth sensor 115e is located upon the back of a van 140. The van may be parked before an inclined platform 150 to facilitate loading and unloading. The depth sensor 115e may be used to infer user gestures to direct the operation of the van (e.g., move forward, backward) or to perform other operations (e.g., initiate a phone call). Because the van 140 regularly enters new environments, new obstacles and objects 145a,b may regularly enter the depth sensor's 115e field of depth capture 120e. Additionally, the inclined platform 150 and irregularly elevated terrain may often place the depth sensor 115e, and corresponding field of depth capture 120e, at oblique angles relative to the "floor" on which the user 105 stands. Such variation can complicate assumptions made regarding the depth data in a static and/or controlled environment (e.g., assumptions made regarding the location of the floor).

Example Depth Data

Like common optical image cameras, depth sensors 115a-e may capture individual "frames" of depth data over time. Each "frame" may comprise a collection of three-dimensional values for depths measured in the field of view. These may be represented, e.g., as points in three-dimensional space, as distances for rays emitted at various angles from the depth sensor, etc. FIG. 2 is a series of perspective 200a and side 200b views of example depth data 205 as may be used in some embodiments. In this example, a user is pointing at the depth sensor with his right hand while standing in front of a wall. A table to his left has also be captured in the field of view. Thus, depth values associated with the user 210 include a portion associated with the user's head 210a and a portion associated with the user's extended right arm 210b. Similarly, the background behind the user is reflected in the depth values 220, including those values 215 associated with the table.

To facilitate understanding, the side view 200b also includes a depiction of the depth sensor's field of view 235 at the time of the frame capture. The depth sensor's angle 230 at the origin is such that the user's upper torso, but not the user's legs have been captured in the frame.

Though FIG. 2 depicts the depth data as a "point cloud", one will readily recognize that the data received from a depth sensor may appear in many different forms. For example, a depth sensor, such as depth sensor 115a or 115d, may include a grid-like array of detectors. These detectors may acquire an image of the scene from the perspective of fields of depth captures 120a and 120d respectively. For example, some depth detectors include an "emitter" producing electromagnetic radiation. The travel time from the emitter to an object in the scene, to one of the grid cell detectors may correspond to the depth value associated with that grid cell. The depth determinations at each of these detectors may be output as a two-dimensional grid of depth values. A "depth frame" as used herein generally refers to such a two-dimensional grid, but can also refer to the more general representations of the three-dimensional depth data acquired from the depth sensor.

Example Depth Data Clipping Methodology

Figure 3:
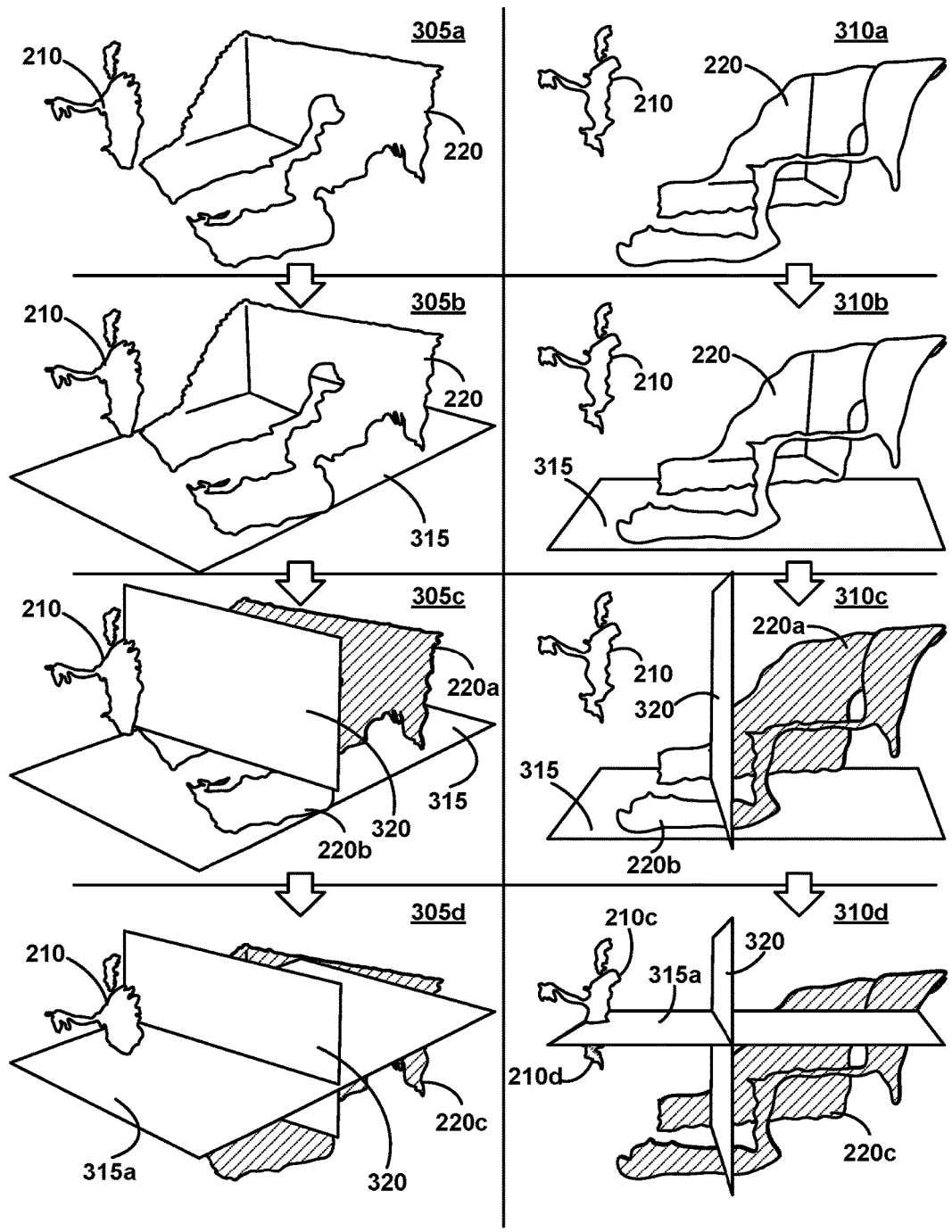
FIG. 3 is a series of views illustrating data isolation via plane clipping as may be applied to the depth data of FIG. 2 in some embodiments.

Many applications would like to infer the user's gestures from the depth data 205. Accomplishing this from the raw depth data could be quite challenging and so some embodiments apply preprocessing procedures to isolate the depth values of interest. For example, FIG. 3 is a series of views illustrating data isolation via plane clipping as may be applied to the depth data 205 of FIG. 2 in some embodiments. Particularly, perspective view 305*a* and side view 310*a* illustrate the depth data 205 (including portions associated with the user 210 and portions associated with the background 220). Perspective view 305*b* and side view 310*b* show the depth data 205 relative to a floor plane 315. The floor plane 315 is not part of the depth frame data 205. Rather, the floor plane 315 may be assumed based upon context or estimated by the processing system.

Perspective view 305*c* and side view 310*c* introduce a wall plane 320, which may also be assumed or estimated by the processing system. The floor and wall plane may be used as "clipping planes" to exclude depth data from subsequent processing. For example, based upon the assumed context in which the depth sensor is used, a processing system may place the wall plane 320 halfway to the maximum range of the depth sensor's field of view. Depth data values behind this plane may be excluded from subsequent processing. For example, the portion 220*a* of the background depth data may be excluded, but the portion 220*b* may be retained as shown in perspective view 305*c* and side view 310*c*.

Ideally, the portion 220*b* of the background would also be excluded from subsequent processing, since it does not encompass data related to the user. Some embodiments further exclude depth data by "raising" the floor plane 315 based upon context to a position 315*a* as shown in perspective view 305*d* and side view 310*d*. This may result in the exclusion of the portion 220*b* from future processing. These clipping operations may also remove portions of the user data 210*d* which will not contain gestures (e.g., the lower torso). Thus, only the portion 210*c* remains for further processing. One will recognize that FIG. 3 simply depicts one possible clipping process for a given context. Different contexts, for example, situations where gestures include the user's lower torso, may be addressed in a similar fashion. Many such operations will still require an accurate assessment of the floor 315 and wall 320 planes to perform accurate clipping.

Example Depth Data Classification Methodology

Figure 4:
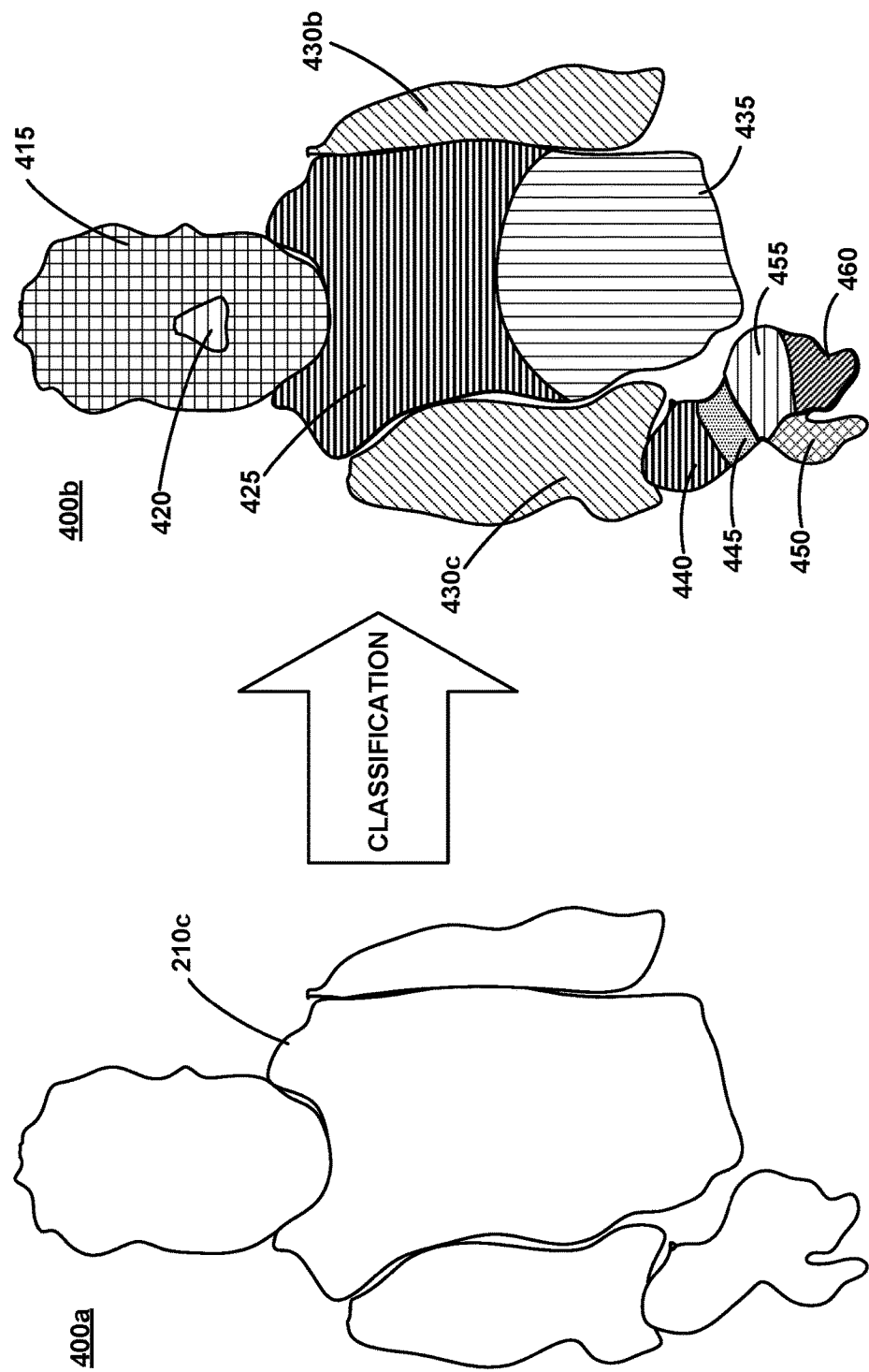
FIG. 4 is an example component classification as may be applied to the isolated data of FIG. 3 in some embodiments.

Following the isolation of the depth values, which may contain gesture data of interest, the processing system may classify the depth values into various user portions. These portions, or "classes", may reflect particular parts of the user's body and can be used to infer gestures. FIG. 4 is an example component classification as may be applied to the isolated data of FIG. 3 in some embodiments. Initially 400*a*, the extracted data 210*c* may be unclassified. Following classification 400*b*, each of the depth values may be associated with a given classification. The granularity of the classification may reflect the character of the gestures of interest. For example, some applications may be interested in the direction the user is looking, and so may break the head into a "head" class 415 and a "nose" class 420. Based upon the relative orientation of the "head" class 415 and the "nose" class 420 the system can infer the direction in which the user's head is turned. Since the chest and torso are not generally relevant to the gestures of interest in this example, only broad classifications "upper torso" 425 and "lower torso" 435 are used. Similarly, the details of the upper arm are not as relevant as other portions and so a single class "right arm" 430*c* and a single class "left arm" 430*b* may be used.

In contrast, the lower arm and hand may be very relevant to gesture determination and more granular classifications may be used. For example, a "right lower arm" class 440, a "right wrist" class 445, a "right hand" class 455, a "right thumb" class 450, and a "right fingers" class 460 may be used. Though not shown, complementary classes for the left lower arm may also be used. With these granular classifications, the system may able to infer, e.g., a direction the user is pointing, by comparing the relative orientation of the classified depth points.

Example Depth Data Processing Pipeline

Figure 5:
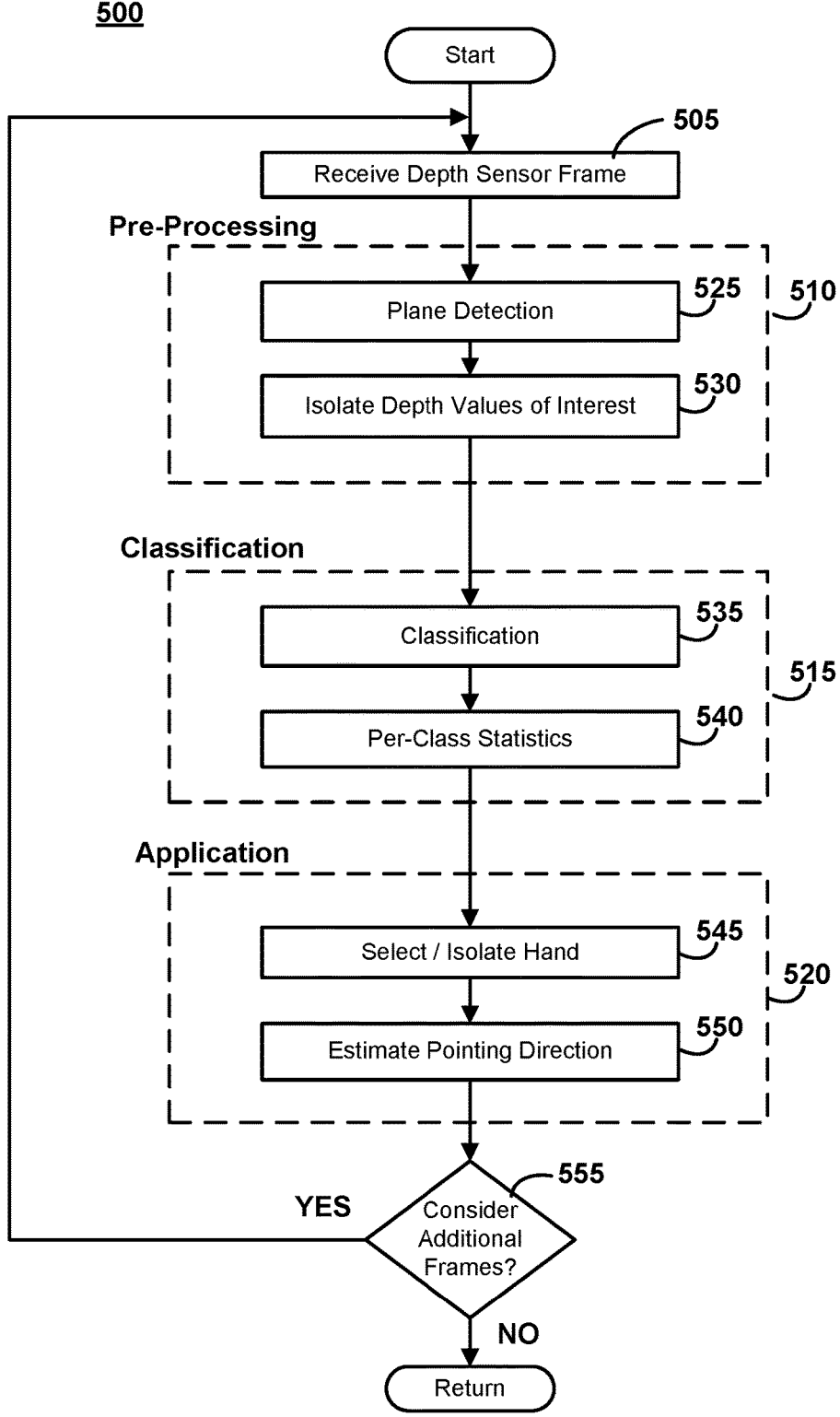
FIG. 5 is a flow diagram illustrating some example depth data processing operations as may be performed in some embodiments.

FIG. 5 is a flow diagram illustrating some example depth data processing operations 500 as may be performed in some embodiments. At block 505, the processing system may receive a frame of depth sensor data (e.g., a frame such as frame 205). Generally speaking, the data may then pass through "Pre-Processing" 510, "Classification" 515, and "Application" 520 stages. During "Pre-Processing" 510, the processing system may perform "plane detection" at block 525 using the frame data or based upon assumptions or depth camera configuration details. This may include, e.g., the clipping planes discussed with respect to FIG. 3, such as the floor 315 plane and wall plane 320. These planes may be used, e.g., to isolate the depth values of interest at block 530, e.g., as described above with respect to FIG. 3.

During Classification 515, the system may associate groups of depth values with a particular class at block 535. For example, the system may determine a classification using classes as discussed with respect to FIG. 4. At block 540, the system may determine per-class statistics (e.g., the number of depth values associated with each class, the effect upon ongoing system training and calibration, etc.). Example classes may include: Nose, Left Index Finger, Left Other Fingers, Left Palm, Left Wrist, Right Index Finger, Right Other Fingers, Right Palm, Right Wrist, and Other.

During the Application 520 operations, the system may use the class determinations to infer user-behavior relevant to a particular application objective. For example, an HCI interface may seek to determine where the user is presently pointing their hand. In this example, at block 545, the system will select/isolate the depth values classified as being associated with the "hand" and/or "fingers". From these depth values (and possibly depth values associated with the user's arm) the system may estimate the direction in which the user is pointing in this particular frame at block 550 (one will recognize that other gestures than this pointing example may also be performed). This data may then be published to an application program, e.g., a kiosk operating system, a game console operating system, etc. At block 555, the operations may be performed again for additional frames received.

Figure 6:
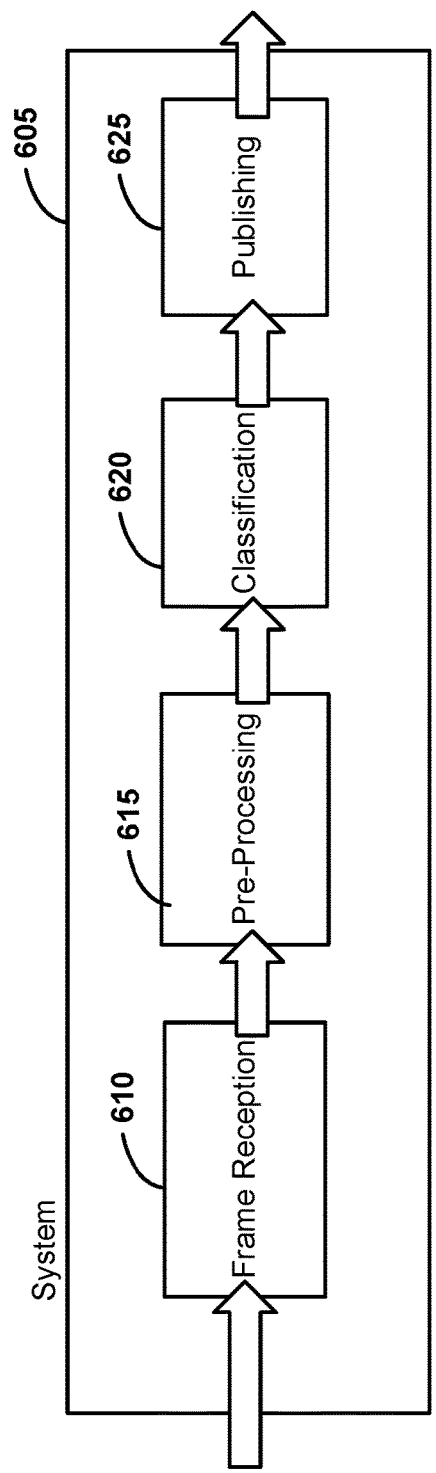
FIG. 6 is a hardware block diagram illustrating an example hardware implementation which may be used to perform depth data processing operations in some embodiments.

FIG. 6 is a hardware block diagram illustrating an example hardware implementation 605 which may be used to perform depth data processing operations in some embodiments. A frame reception system 610 may receive a depth frame from a depth sensor. The frame reception system 610 may be firmware, software, or hardware (e.g., an FPGA implementation, system-on-a-chip, etc.). The frame may be directly passed, or cached and subsequently passed, to a pre-processing module 615. Pre-processing module 615 may also be firmware, software, or hardware (e.g., an FPGA implementation, system-on-a-chip, etc.). The pre-processing module may perform the Preprocessing operations 510 discussed in FIG. 5. The pre-processing results (e.g., the isolated depth values 210*c*) may then be provided to the Classification module 620. The Classification module 620 may be firmware, software, or hardware (e.g., an FPGA implementation, system-on-a-chip, etc.). The Classification module 620 may perform the Classification operations 515 discussed in FIG. 5. The classified depth values may then be provided to a Publishing module 625. The Publishing module 625 may be configured to package the classification results into a form suitable for a variety of different applications (e.g., as specified at 520). For example, an interface specification may be provided for kiosk operating systems, gaming operating systems, etc. to receive the classified depth values and to infer various gestures therefrom.

Example Two-Dimensional Feature Classification Methodology

In some embodiments, classification at block 535 may be performed directly upon the three-dimensional data contained in the depth frame. The depth sensor may have acquired the depth values in the frame in a grid-like collection of detectors. Thus, each "pixel" in the depth frame may be a depth value acquired at a corresponding detector in the grid. If the depth sensor does not provide the depth data in this form, some embodiments may pre-preprocess the data to convert the data to this two dimensional pixel representation.

Figure 7:
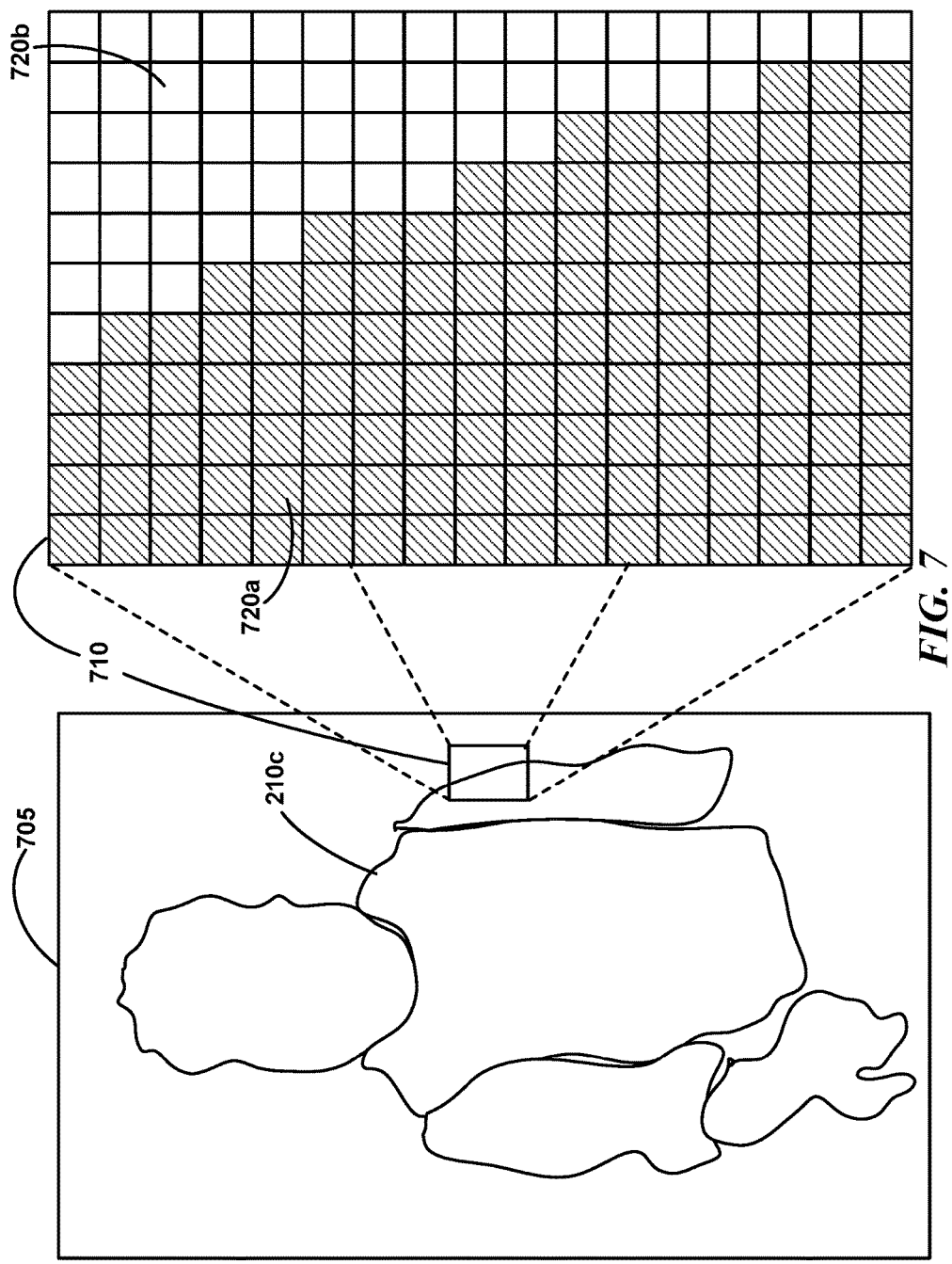
FIG. 7 is a representation of pixels in an example depth data frame as may be acquired by a depth sensor in some embodiments.

FIG. 7 is a representation of pixels in an example depth data frame as may be acquired by a depth sensor in some embodiments. As discussed herein, the depth determinations at each of the detectors in a depth sensor may be output as a two-dimensional grid of depth values (a "depth frame"). Depth frame 705 may thus consist of a large grid of depth values depicting the original depth data 210*c* (here shown post-clipping). For example, considering the smaller region 710 of the depth frame 705 in an enlarged view, one will readily recognize pixels with relatively short depth values 720*a* (here depicted as shaded values corresponding to the user's left arm) and pixels with relatively large depth values 720*b* (here depicted as unshaded values corresponding to the region behind the user, such as a wall). One will recognize that not all the pixels within each of the regions 720*a* and 720*b* are likely to exhibit the exact same value. Still, a pixel from one region compared with a pixel from another region will likely exhibit considerable depth disparity. By comparing pixels associated with similar and dissimilar regions, the system may discern the nature of the objects appearing in the depth frame.

Figure 8:
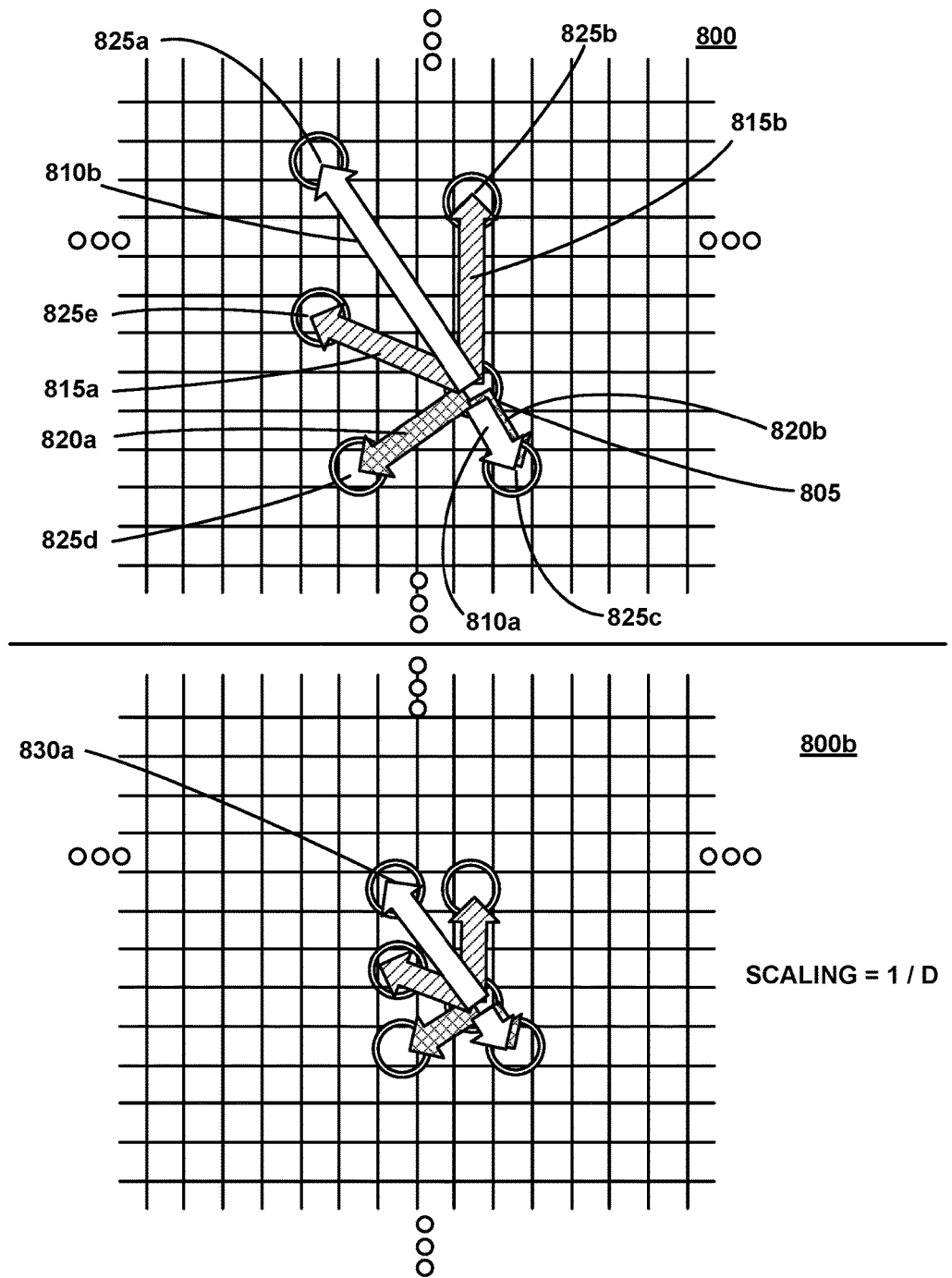
FIG. 8 illustrates several example features on a pixel grid as may be used in some embodiments.

Particularly, classification may proceed using "features" applied to the frame's depth values so as to arrive at a class assignment for each depth point (e.g., as occurred in FIG. 4). A "feature" may be represented in a variety of fashions, but generally speaking, involves a tool for comparing depth values at two or more pixels relative to the position of a pixel for classification and outputting one or more results. FIG. 8 illustrates three example features on a depth pixel grid 800 as may be used in some embodiments. Though FIG. 8 employs vectors to facilitate understanding, one will recognize that a collection of features could be represented in a variety of manners, e.g., as one or more "templates" centered about a pixel for classification. The templates may be a Cartesian grid indicating which pixels are to be compared—such templates could be passed over the entire depth frame as each pixel in the frame is considered for classification. Thus, the description of a feature as used here, referring to "vector offsets", is merely to facilitate understanding and one will recognize alternative ways for representing such a tool (e.g., features could be an array of offset points, a template moved across the depth frame image, a look-up table of offsets, etc.). Similarly, the two-offset features are described herein, one can imagine features using only one offset or more than two offsets for determining comparisons.

Each feature in FIG. 8 is here represented as a pair of vector offsets. For example, given a candidate point 805 for classification, a first feature may consist of the first offset 810*a* and the second offset 810*b*. These offsets indicate that the pixel depth values at locations 825*c* and 825*a*, respectively, are to be compared in determining a classification designation for the pixel 805. For example, if the depth value at point 825*c* is greater than the value at point 825*a*, then the feature's result may be "positive". Conversely, if the value at point 825*c* is less than the value at point 825*a* then the feature's result may be "negative" (the comparison may not take on these particular values or even be binary, but may employ a range of values in some embodiments). Some features may also consider the depth value at point 805 in their assessment, comparing the depth value at point 805 with one or more of the values at locations 825*c* and 825*a* as well. Similarly, an offset vector may be (0,0) implying that it is the value of the depth pixel to be classified that is to be compared. Additionally, one will recognize that features may share offsets, e.g. as shown here between the feature with offset 810*a* and the feature with offset 820*b*. Features represented by points 825*c-e* and vector offsets 810*a,b*, 815*a,b*, 820*a,b*, may be applied in an analogous manner when classifying pixel 805.

In some embodiments, the vector offsets 810*a,b*, 815*a,b*, 820*a,b* may be scaled by 1/depth of the value at point 805, e.g., as shown in scaled representation 800*b* (note that the pixel grid is not scaled, only the offset lengths). For example, if 'd' is the depth at point 805 and (dx,dy) is the offset vector 810*b*, then rather than the point 825*a*, a point at the offset (dx/d, dy/d) may be used for comparison (e.g., the point 830*a*). Thus, the features may begin with "default" offset values, which may be adjusted based upon the depth value of the current pixel being considered for classification. This scaling behavior may make the feature 'scale-invariant'. For example, an object further from the depth sensor may appear smaller in the depth frame than when the object is closer to the depth sensor. Ideally, pixels associated with the object would still be correctly classified as corresponding to that same object, regardless of the object's distance from the depth sensor. By scaling the offsets to points neighboring the point under consideration, the system may anticipate these effects of perspective.

Figure 9:
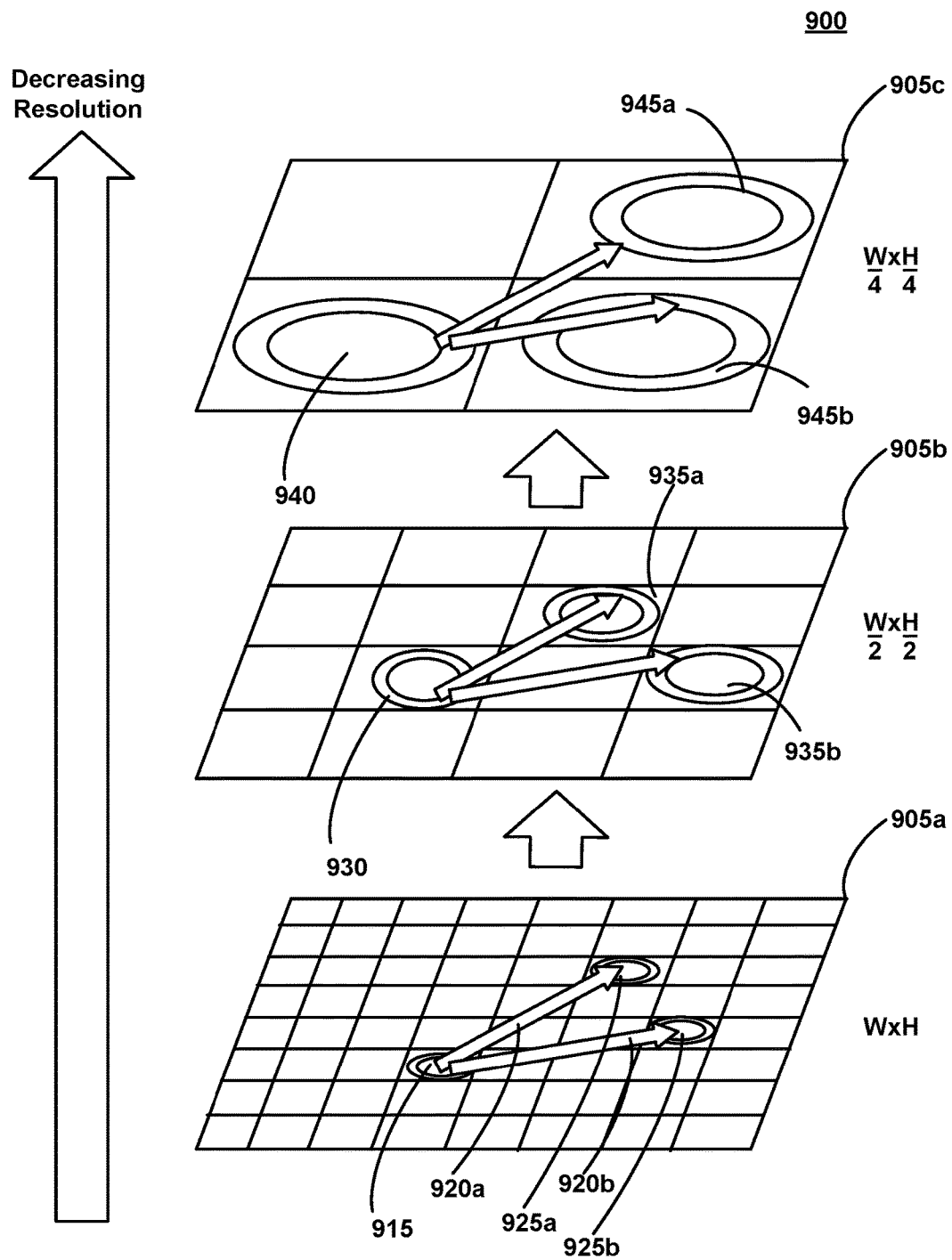
FIG. 9 illustrates the use of features in relation to a depth frame resolution pyramid as may be used in some embodiments.

To economize processing, some embodiments may also apply features to subsampled forms of the original depth frame image. Not only may using subsampled frames increase processing speed, but features used in conjunction with multiple resolutions may result in more accurate classification results. FIG. 9 illustrates the use of features in relation to a depth frame resolution pyramid 900 as may be used in some embodiments. Given an original depth frame 905*a* of pixel dimensions W×H, a feature for classifying pixel 915 may include vector offsets 920*a* and 920*b*. In the original depth frame 905*a* these offsets may correspond to pixels 925*a* and 925*b*. In some embodiments, the system may generate or receive from the depth sensor, e.g., sub-sampled versions 905*b* (half-sampled) and 905*c* (quarter sampled). For example, the depth values may be averaged among neighboring pixels in original depth frame image 905*a* to form a new pixel. Each of these subsampled frames may also be used to inform classification (e.g., as forming their own branches in a tree as described herein). The original offsets 920*a* and 920*b* may be used as a guide for applying the vectors in these subsampled frames. For example, in subsampled frame 905*b* the vector offsets 920*a* and 920*b* may indicate that classification of subsampled pixel 930 depends upon the subsampled pixels 935*a* and 935*b* respectively. Similarly, in subsampled frame 905*c* the vector offsets 920*a* and 920*b* may indicate that classification of subsampled pixel 940 depends upon the subsampled pixels 945*a* and 945*b* respectively. In some embodiments, the subsampled images would be used only for classifying the original pixel 915 (that is, these embodiments would not bother to classify the subsampled pixels 930 and 940, but may still consider the comparison of values in the subsampled frames in the classification determination).

Example Two-Dimensional Feature Tree Generation

Although three features were discussed in FIG. 8 to facilitate understanding, many features may be used in a "tree" to more accurately classify a pixel in some embodiments. For example, the features may be applied in succession (e.g., as a template) based upon the results of preceding features in a decision "tree" for classification. FIG. 10 illustrates an example use of features to generate a classification tree as may occur in some embodiments. Given projected depth data 715, the processing system may iterate over and classify the depth points associated with each pixel. For example, given a depth value corresponding to the position 1005, the system may apply several features 1020*a-d* and ascertain a classification based upon their cumulative result. A tree 1000*a* may be used, organizing the feature results into a series of binary classifications. "Feature 1" 1020*a* may compare, e.g., the depth values at positions corresponding to its offset vectors. If there is a "match" (e.g., if the feature output is positive), then the tree may consider another feature, e.g., Feature 2 1020*b* which may compare the depth values at Feature 2's 1020*b* corresponding offsets (had there not been the match, a different feature than Feature 2 may be applied). A successful match with Feature 2 1020*b* may result in comparison using the values at the offsets of Feature 3 1020*c*. Conversely, an unsuccessful match may result in a comparison using the offsets of Feature 4 1020*d*. Eventually, the cascading matches/non-matches will result in a conclusion that the depth value at position 1005 should be classified in one of classes 1025*a-c*. Thus, Features 1-4 may comprise a "template" or "corpus" of features that can be considered at each of the points in the image. Though a binary "match/no-match" is provided in this example, one will recognize variations wherein a spectrum of feature outputs may be provided. Such a tree 1000*a* may be constructed in a variety of manners given one or more training images, e.g., as described with respect to FIG. 11.

Figure 11:
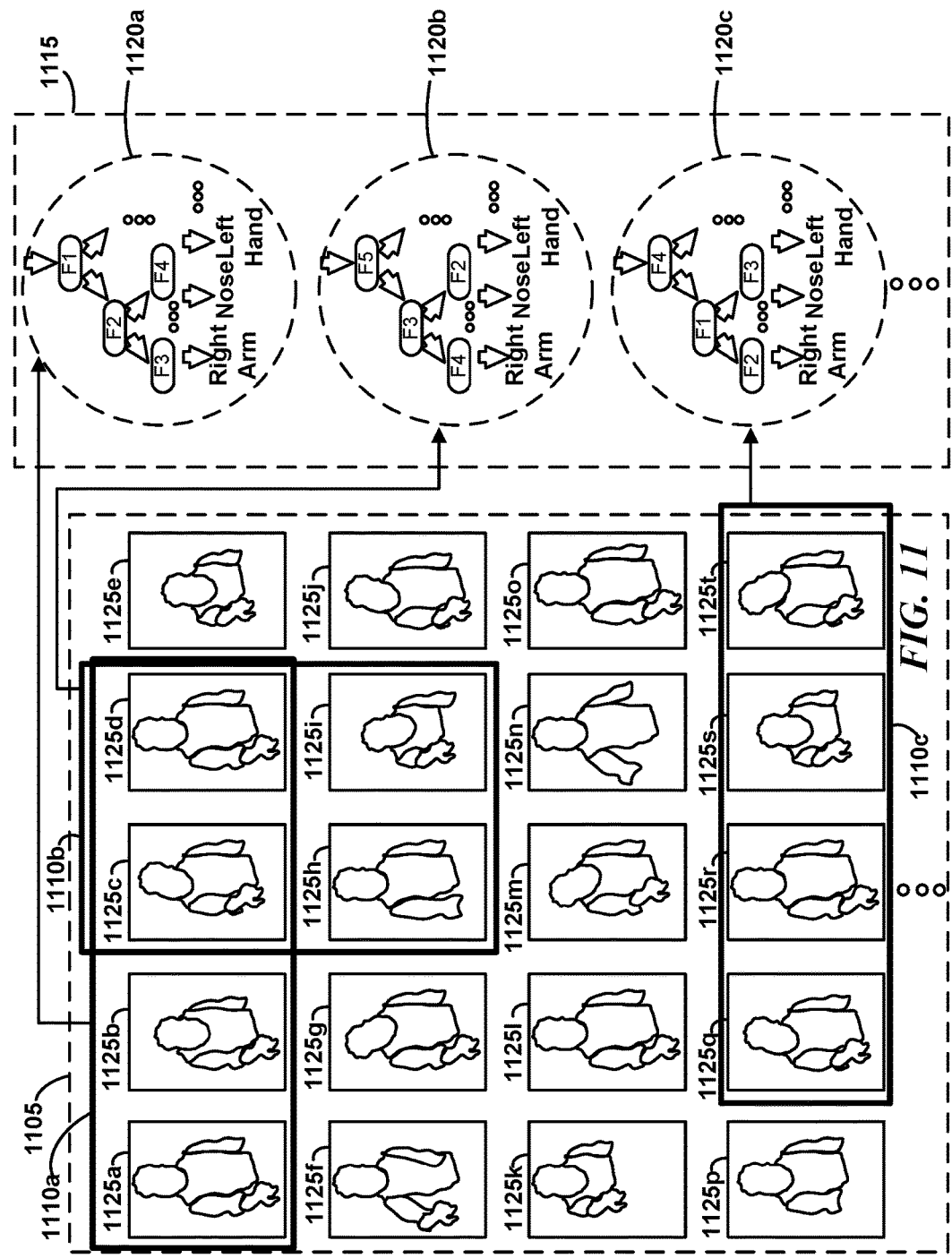
FIG. 11 illustrates an example forest generated from a training set of projected depth images as may occur in some embodiments.

While a single tree may suffice to accurately classify the depth values in some situations, often it may be more robust to use many different trees and to consider all of their outputs. Such a collection of trees may be referred to as a "forest". FIG. 11 illustrates an example forest generated from a training set of projected depth images as may occur in some embodiments. The forest may be generated using a corpus of training images 1105 comprising individual images 1125*a-t*. The individual images 1125*a-t* may be of one or more users in different poses. The images in the training corpus may be selected to reflect the spectrum of possible user poses encountered in actual in-situ environments. The depth values in each image may already be classified, e.g., by hand by a human reviewer. Based upon these preexisting classifications the training images may be broken into groups, e.g., groups 1110*a-c*. These groups may be selected so as to maximize the variance across their training images, to maximize variance between the groups, to recognize a specific pattern, etc. Individual trees 1120*a-c* may be generated using each of the corresponding training images (e.g., selecting a permutation of the feature assignments in the tree that results in the closest correspondence to the correct classification provided with the training data). Together, these trees may form a forest 1115 that can be used for in-situ classification. To classify a depth value at a position in the image, the value may be considered by each of the trees and the most frequent classification result among the trees taken as the final classification. One will recognize variations on methods for assessing the tree output to identify a classification, e.g., weighted averages, etc.

Figure 12:
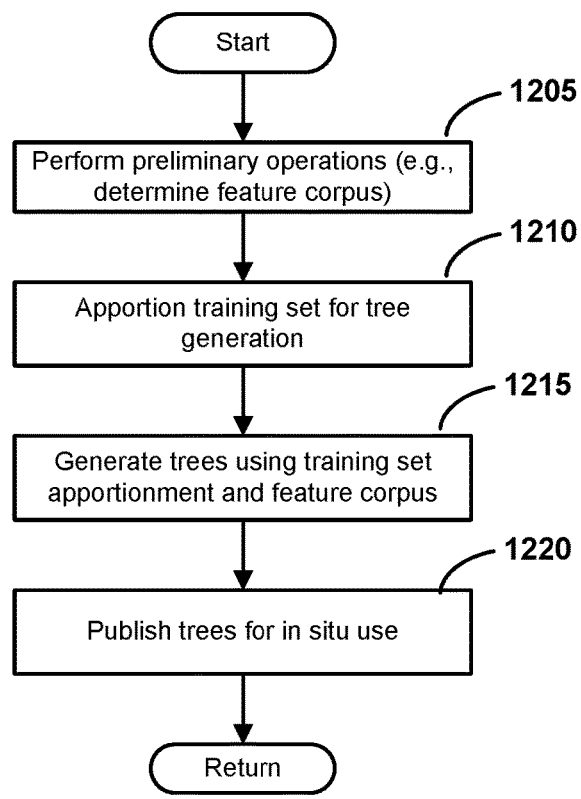
FIG. 12 is a flow diagram illustrating operations in an example forest generation process as may occur in some embodiments.

FIG. 12 is a flow diagram illustrating operations in an example forest generation process 1200 as may occur in some embodiments. At block 1205, the processing system may perform various preliminary operations (e.g., acquiring the training images, determining classifications for the portions of the training images [possibly with human assistance], selecting the corpus of features for use in the trees [different feature subsets may be used for different trees in some embodiments], etc.). The processing system performing these operations may or may not be the same system coupled to the depth sensor described above (e.g., training may occur off-site in a controlled environment). At block 1210, the processing system, possibly with human assistance, may determine groupings of images within the training set for generating the trees. At block 1215, the trees may be generated for each group. For example, multiple feature placements may be tried for the corresponding group of training images and the features placements most closely reproducing the known, correct classifications, used for the tree. The trees may then be organized into a forest and published, e.g., for in situ use at block 1220.

Improved Feature Distribution

As discussed above with respect to FIG. 8 a feature may consist of multiple offset points, e.g., points 825*a* and 825*c* relative to a point for classification 805. These offsets used to construct the features may be selected from an initial distribution. Accordingly, the initial distribution may influence the efficiency and effectiveness of the trees that depend upon them.

Figure 13:
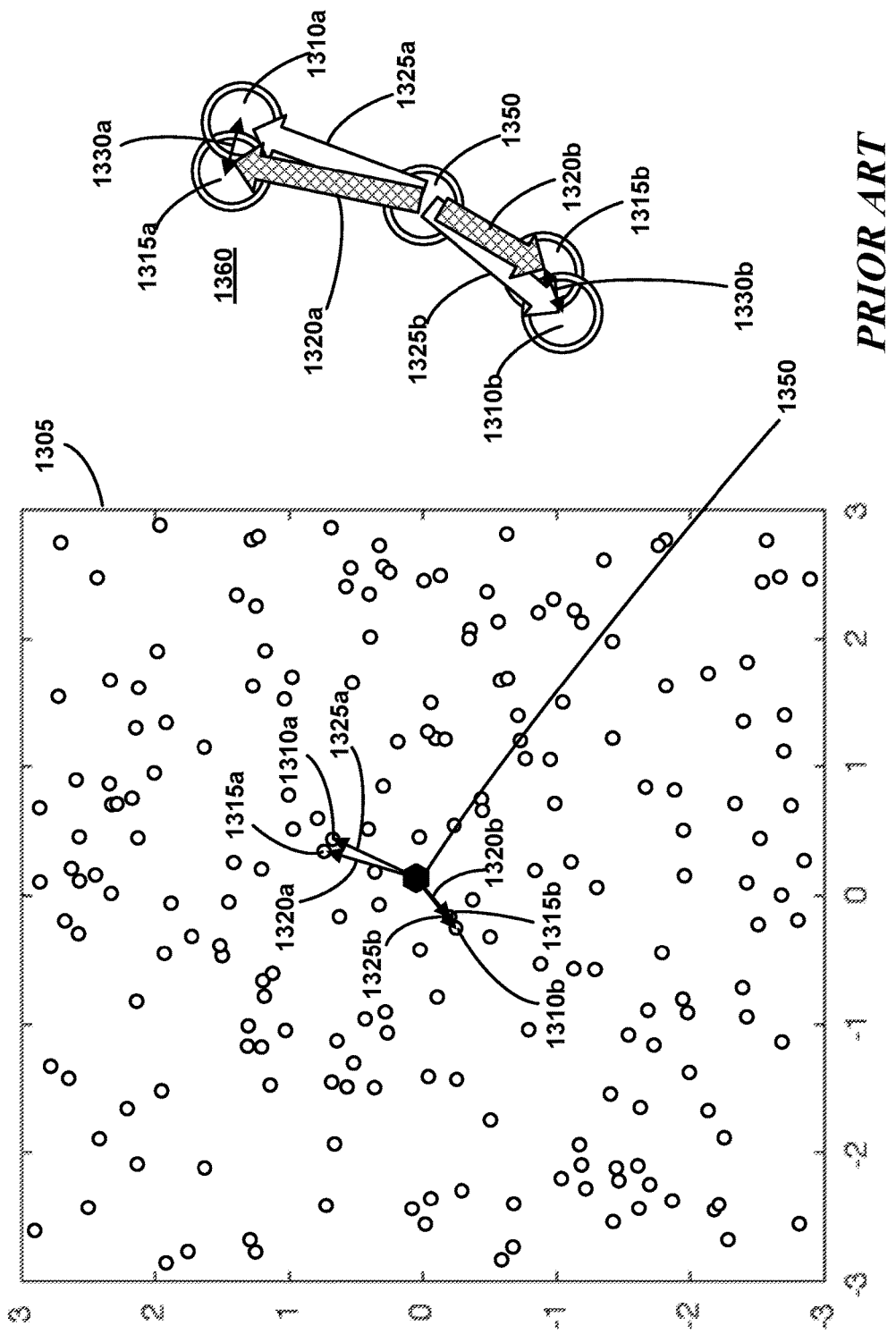
FIG. 13 is a plot of a random, uniformly distributed collection of feature endpoints as may be used in some systems.

In some systems, the offsets for each of the features may simply be random, uniformly distributed around the point of consideration. FIG. 13, e.g., is a plot 1305 of a random, uniformly distributed collection of feature endpoints as may be used in some systems (the axes provided are merely for reference and the number of pixels in an offset may be on the order of 1's, 10's, 100's, etc.). For example, a first feature may be generated using offsets 1320*a* and 1320*b* (to pixels 1315*a* and 1315*b* respectively) and a second feature using offsets 1325*a* and 1325*b* (to pixels 1310*a* and 1310*b* respectively) relative to the pixel being classified 1350. While such a random distribution has been used in past systems, it often has the undesirable property that the generated features may consider the same or similar information. Particularly, the separation 1330*a* between the pixels 1315*a* and 1310*a* may not be very large, nor the separation 1330*b* between the pixels 1310*b* and 1315*b* (see the exaggerated view 1360). In fact, the distance between pixels in a single feature may not be very large. Because of this small separation, many features consider redundant information. Not only is such redundancy inefficient, but it may result in overfitting to particular aspects of the training data.

Figure 14:
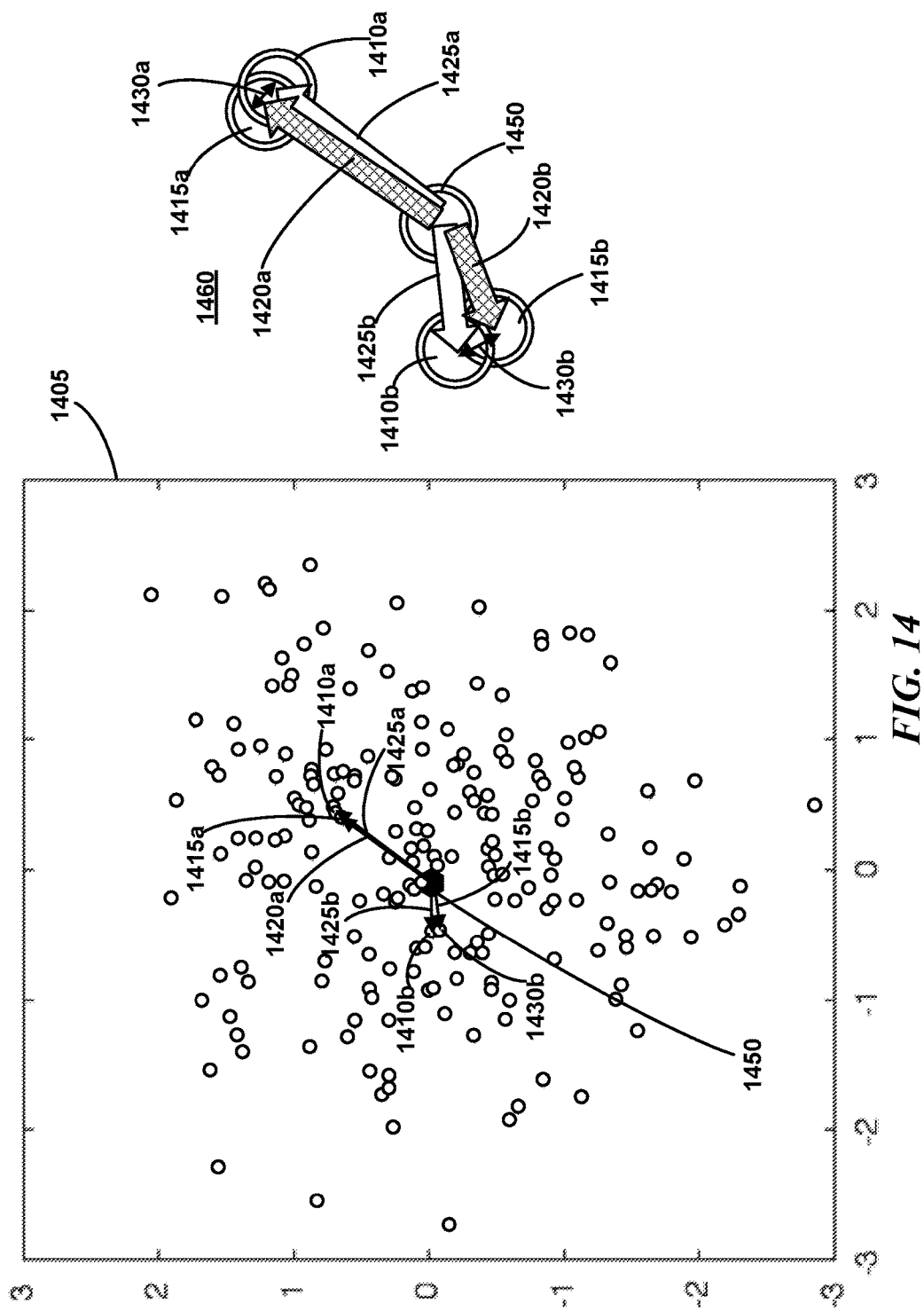
FIG. 14 is a plot of a random, Gaussian distribution of feature endpoints as may be used in some embodiments.

As offsets near the pixel under consideration may be more useful in classification, some embodiments instead use offsets taken in a randomized Gaussian distribution to achieve a better distribution than the random distribution of FIG. 13. For example, FIG. 14 is a plot 1405 of a random, Gaussian distribution of feature endpoints as may be used in some embodiments. Again, a point in an image for consideration may be situated at center 1450. Each of the offset points may be generated with reference to a Gaussian function (e.g., the probability of placing a point a given location is proportional to a corresponding value in a Gaussian distribution).

Unfortunately, many of the points in this random Gaussian distribution may also present redundant information. For example, in the exaggerated view 1460 one can see that the separations 1430a and 1430b between points 1415a, 1410a and 1415b, 1410b respectively are still quite small. Again, this may result in redundant branches in a tree corresponding to features with the offsets 1420a, 1420b and 1425a, 1425b. Not only may such redundancy lead to wasteful computation, but it may also lead to overfitting of the training images. This overfitting may result in the forest being too specifically tuned to the training data and insufficiently robust to recognize dynamic, real-world situations.

Figure 15:
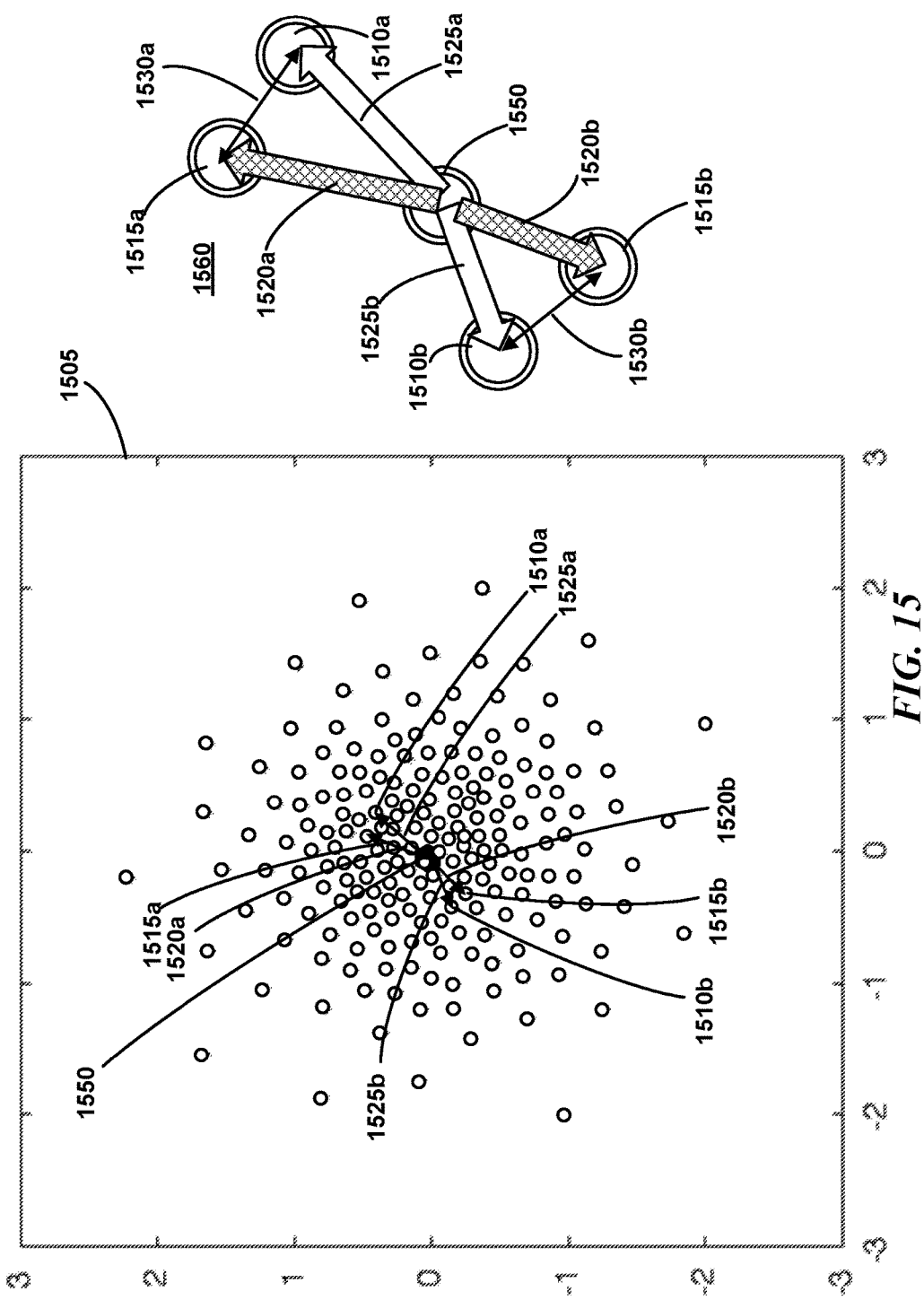
FIG. 15 is a plot of a Well-Constructed Gaussian distribution of feature endpoints as may be used in some embodiments.

To mitigate such problems, some embodiments instead construct and/or use a deliberately spaced "Well-Constructed Gaussian" distribution of feature offsets. For example, FIG. 15 is a plot 1505 of Well-Constructed Gaussian distributed feature offset points as may be used in some embodiments. A point in an image for consideration may be situated at center 1550. Here, each of the offset points, e.g., points 1520a, 1520b, may be placed in a generally "Gaussian" distribution about the center 1550.

Because the offsets are arranged in a deliberately spaced Gaussian distribution, offsets closer to the center 1550 remain relatively densely clustered, while offsets further away become increasingly separated. Thus, as illustrated in the exaggerated view 1560 one can see that the separations 1530a and 1530b between the feature with offsets 1520a, 1520b and points 1515a, 1515b and the feature with offsets 1525a, 1525b and points 1510a, 1510b are much better separated than in the preceding figures. Consequently, branches within a tree based upon comparisons with these offsets will usually be providing more variation in their information than in a random distribution and may consequently help avoid overfitting. Retaining a more dense cluster near the center 1550 also allows subtle variations around depth points to be considered (e.g., identifying a nose), while also allowing more gross classes (e.g., the upper torso) to be more easily identified based upon the less dense, more distant points. The more dense points may still be well distributed, rather than simply random, to ensure greater information variance as discussed in greater detail herein. In some embodiments, use of a Well-Constructed Gaussian may allow a system to achieve the same recognition performance as a random distribution, but with a quarter of the sampling points. Thus, the training time may also be about four times faster with a Well-Constructed Gaussian than with the random distribution of FIG. 13.

Figure 16:
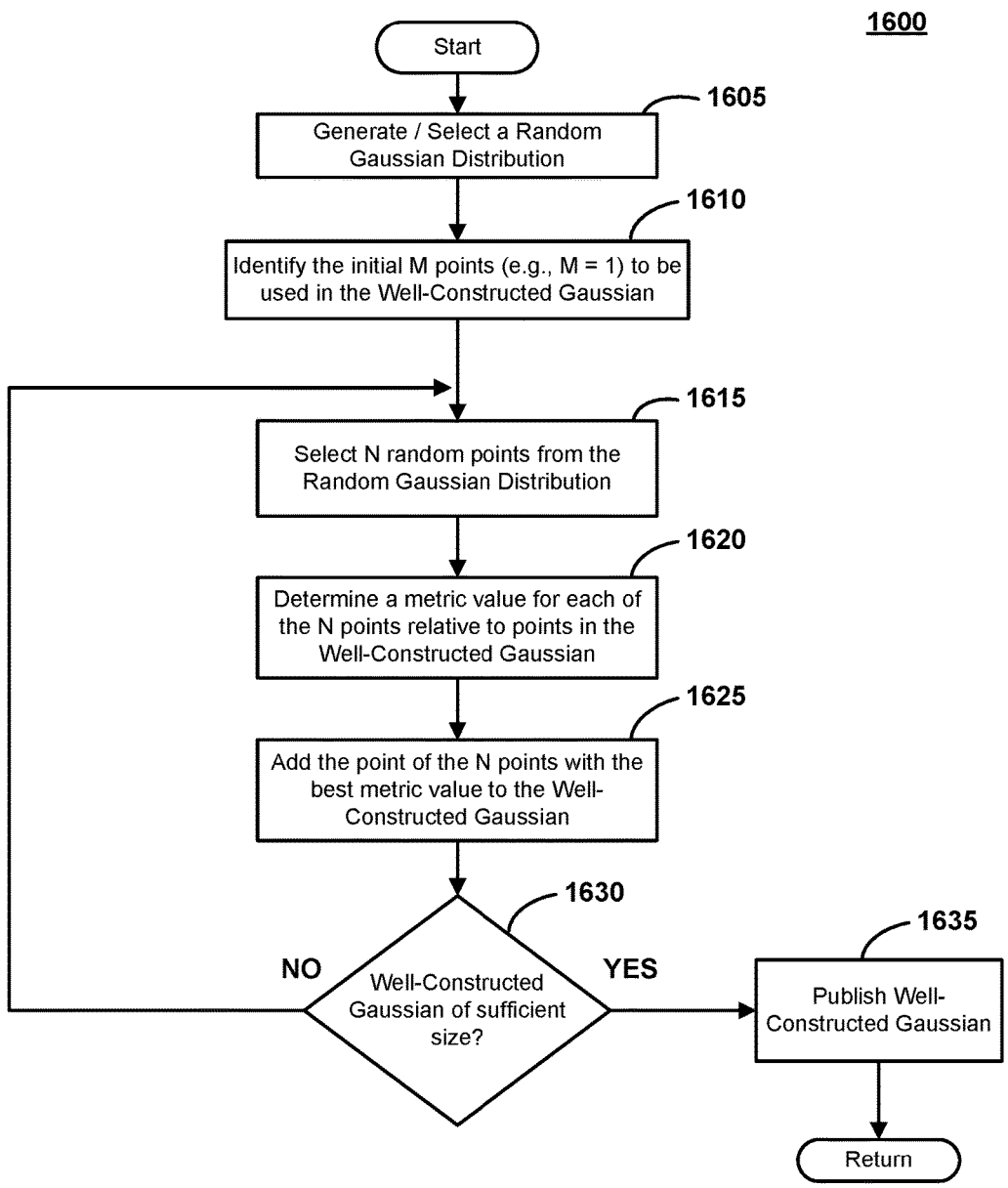
FIG. 16 is a flow diagram of an example process for generating a Well-Constructed Gaussian distribution of feature endpoints as may be implemented in some embodiments.

FIG. 16 is a flow diagram of an example process for generating a Well-Constructed Gaussian distribution of feature endpoints (e.g., as depicted in FIG. 15) as may be implemented in some embodiments. At block 1605, a computer system may generate or receive a "Randomized Gaussian", e.g., as depicted in FIG. 14. Again, the computer system performing these operations may be any processing system discussed herein. For example, the computer system may be a processing system at an off-site training facility distinct from the processing system (shown in FIG. 6) coupled to the depth sensor (alternatively, it may be the processing system in FIG. 6, or a component thereof, coupled to the depth sensor). The generated distribution may be used, e.g., when applying features in the Classification module 620.

The points in the "Random Gaussian" distribution are unlikely to be desirably spaced, particularly near the more dense center, as discussed herein. At block 1610, the system may determine an initial M points to be used in constructing the Well-Constructed Gaussian offset distribution. M may, e.g., be "1" and the initial point forming the Well-Constructed Gaussian may simply be a randomly selected offset point, e.g., near the center of the Randomized Gaussian distribution.

The system may then iterate through blocks 1615, 1620, and 1625 until the Well-Constructed Gaussian is determined to have a sufficient number of features/offsets at block 1630 (e.g., a minimum number of offsets may have been reached in the Well-Constructed Gaussian distribution). For each iteration, at block 1615, the system may select N random Gaussian distributed offset points form the Random Gaussian (which, depending upon the embodiment, may or may not include the possibility of selecting any of the original M points or previously selected points). At block 1620, the system may determine a metric value for each of the N points based upon the offset points currently present in the Well-Constructed Gaussian. At block 1625, the point of the N points (or a best set of the N points) with the best metric value (e.g., the highest, or lowest numerical value, depending upon the metric) may be added to the Well-Constructed Gaussian.

Once the Well-Constructed Gaussian distribution has been constructed it may be published at block 1635 (e.g., provided for use in a training system and later in-situ). One will recognize that the features generated from the distribution may be represented in many different forms from that in which the distribution was originally generated (tables, templates, vector arrays, etc.). Again, the system performing the construction process may be any of the processing systems described herein (e.g., on-site coupled to the depth sensor, off-site at a controlled training facility, independently on a computing device, etc.)

Improved Feature Distribution—Construction

Figure 17A:
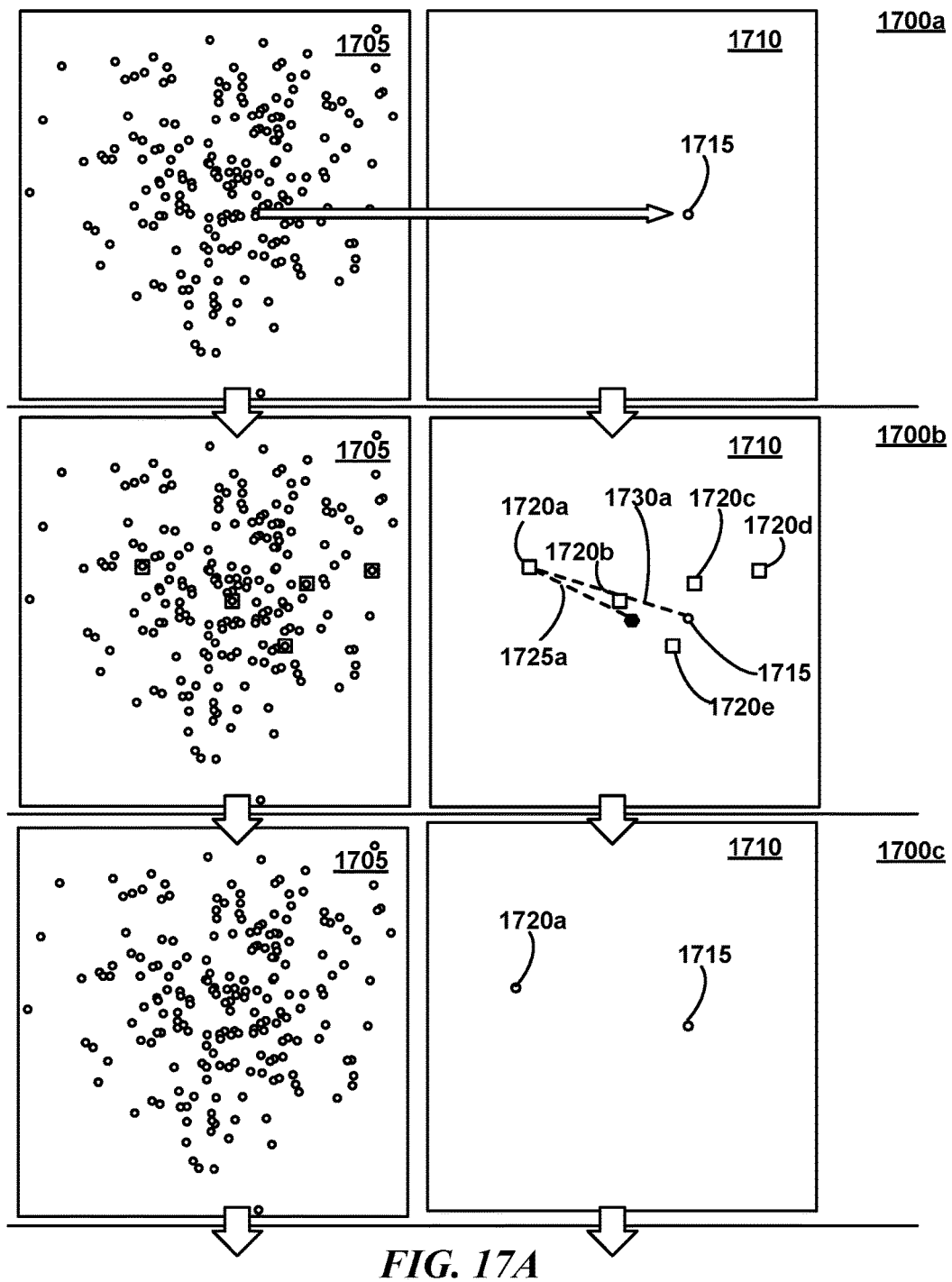
FIGS. 17A and 17B illustrate several steps in the creation of a Well-Constructed Gaussian distribution of feature endpoints from a randomly generated Gaussian feature distribution as may occur in some embodiments.
Figure 17B:
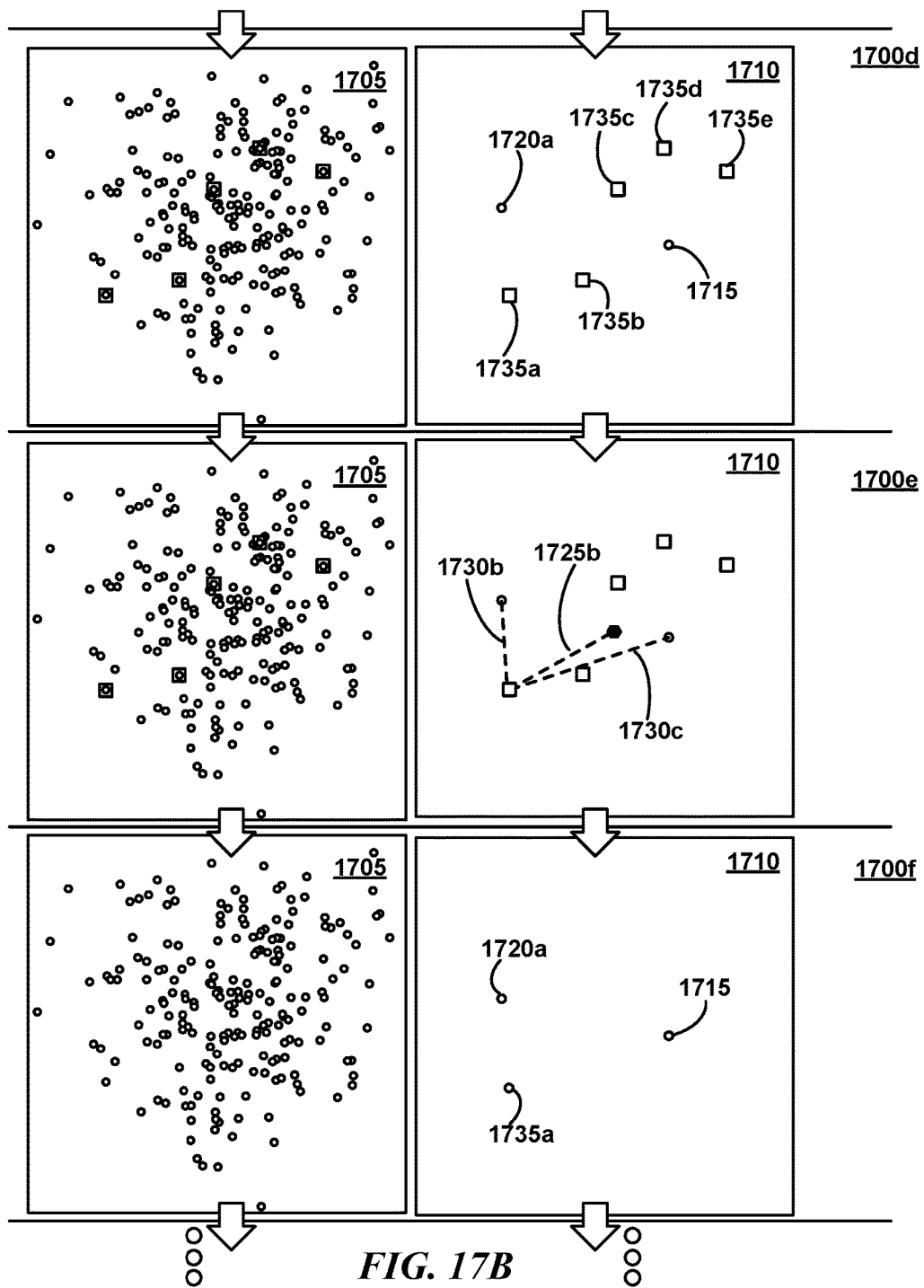

To facilitate understanding, FIGS. 17A and 17B illustrate several steps in the creation of a Well-Constructed Gaussian feature distribution from a randomly generated Gaussian feature distribution, e.g., using a process such as depicted in FIG. 16, as may occur in some embodiments. Initially, at step 1700a, an initial M points (e.g., the single point 1715) may be selected from the Random Gaussian Distribution 1705 to form the Well-Constructed Gaussian 1710.

At step 1700b, a collection of N points (here N=5) 1720a-e may be selected from the Random Gaussian Distribution 1705. These points may be compared with the points already present in the Well-Constructed Gaussian (e.g., point 1715) as part of a metric assessment. Particularly, the metric may consider both the distance of each of the N points to the points already present in the Well-Constructed Gaussian (e.g., the distance 1730a from point 1720a to point 1715) as well as the distance of each of the N points to the center of the distribution (e.g., the distance 1725a from point 1720a to the center).

For example, in some embodiments the metric for a given point P (e.g., 1720a) of the N points may include summing the distance to each of the current Well-Constructed Gaussian Points (W) scaled by a factor related to the distance of the point P from the center. As an example, the metric value for the point P may be:

$$\text{Metric}(P) = \text{Min}\{\text{Sub}_{Metric}(P, W_1), \ldots, \text{Sub}_{Metric}(P, W_{N_{Total}})\} \quad (1)$$

where the "Total" is the current total number of points in the Well-Constructed Gaussian and the "Sub_Metric" function is:

$$\text{Sub\_Metric}(P, W) = e^{-\left(\frac{P_x+W_x}{2}\right)^2 - \left(\frac{P_y+W_y}{2}\right)^2} \sqrt{(P_x - W_x)^2 + (P_y - W_y)^2} \quad (2)$$

where $P_x$ and $P_y$ are the X and Y coordinate of the Random Gaussian point P respectively, and $W_x$ and $W_y$ are the X and Y coordinate of the Well-Constructed Gaussian point under consideration, respectively.

The Sub_Metric determines the distance from the point P to the current Well-Constructed Gaussian point W under consideration via the term:

$$\sqrt{(P_x-W_x)^2+(P_y-W_y)^2} \quad (3)$$

This distance may then be scaled by the point P's distance from the center. The point's X and Y coordinate, $P_x$ and $P_y$ respectively, are already with respect to the center. Since the metric is concerned with the distance to the closest point in the already constructed point-set, the Gaussian may be evaluated at the halfway point between P and W. This may makes the distance function symmetric, such that Sub_Metric(P, W) is the same as Sub_Metric(W, P). This distance factor may be taken as an exponential as shown below:

$$e^{-\left(\frac{P_x+W_x}{2}\right)^2 - \left(\frac{P_y+W_y}{2}\right)^2} \quad (4)$$

Thus, this exponential function may be used to ensure a desired proportional weighting of the term in Equation (3). The metric function provided here is merely exemplary (though found quite suitable in many applications) and one will readily recognize variations achieving the same or similar effect.

At step 1700c, the system may select the point of the N points with the best metric result (e.g., point 1720a) to be included in the Well-Constructed Gaussian (in this example only a single point is selected, but in some embodiments, more than one of the N points may be included). At step 1700d, the system may again randomly select N points 1735a-e from the Random Gaussian 1705. Though N remains "5" in this example, one will recognize that in some embodiments the number of points considered may change with the iterations. Again, at step 1700e the metric value for each of the 1735a-e points may be determined based upon their distances (e.g., distances 1730b, 1730c) to the current points of the Well-Constructed Gaussian as well as the distance (e.g., 1725b) to the center.

At step 1700f the point of the N points (here point 1735a) with the best metric value may be selected and incorporated into the Well-Constructed Gaussian. In this example, there are now three points in the Well-Constructed Gaussian and the process may continue until a desired number (e.g., 200) have been incorporated. Points incorporated in this manner should result in a Well-Constructed Gaussian with the points well-spaced as described herein.

Improved Feature Distribution—Construction

Figure 18:
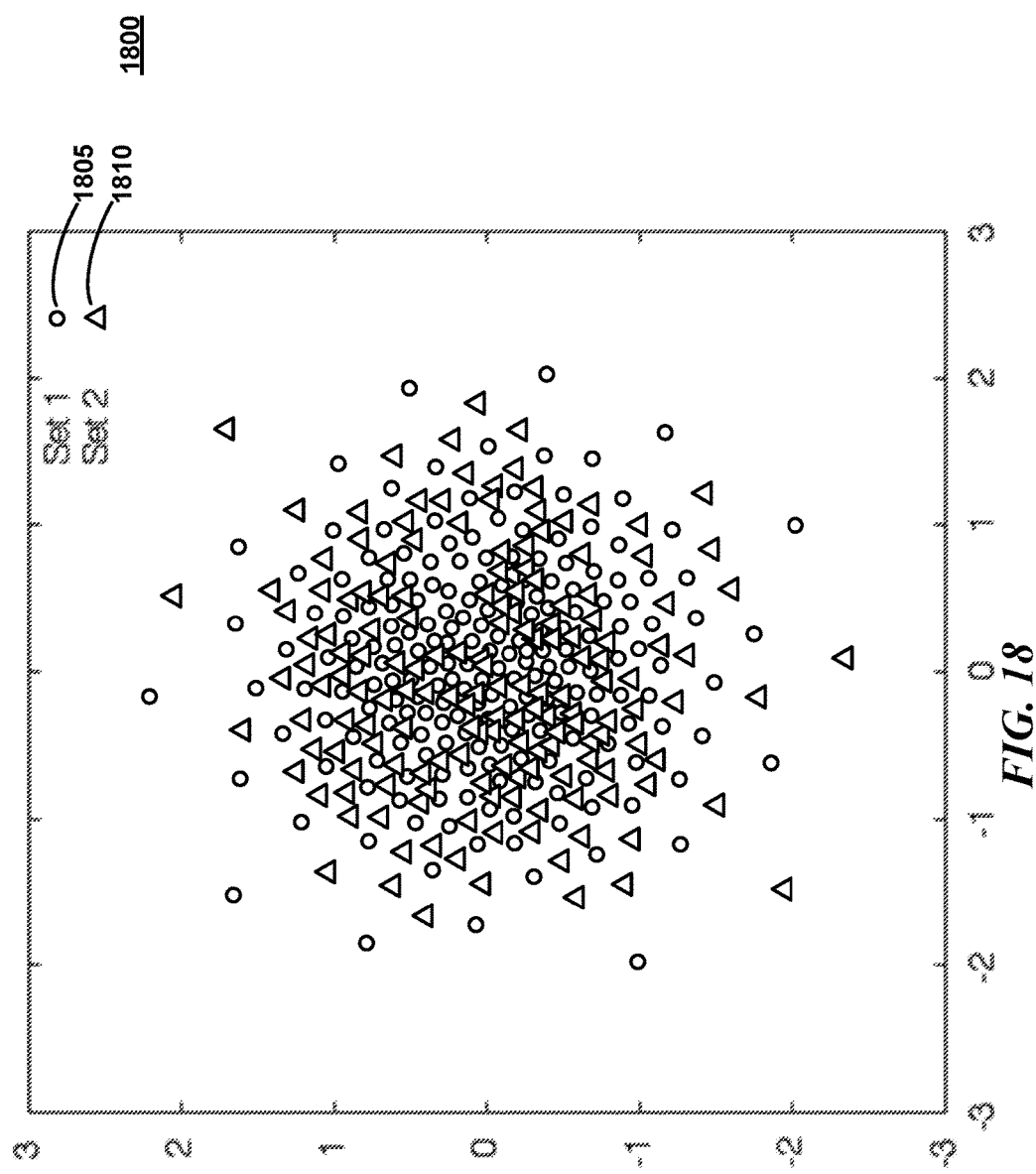
FIG. 18 is a plot illustrating two subsets of Gaussian feature endpoint distributions as may be generated in some embodiments.
Figure 19:
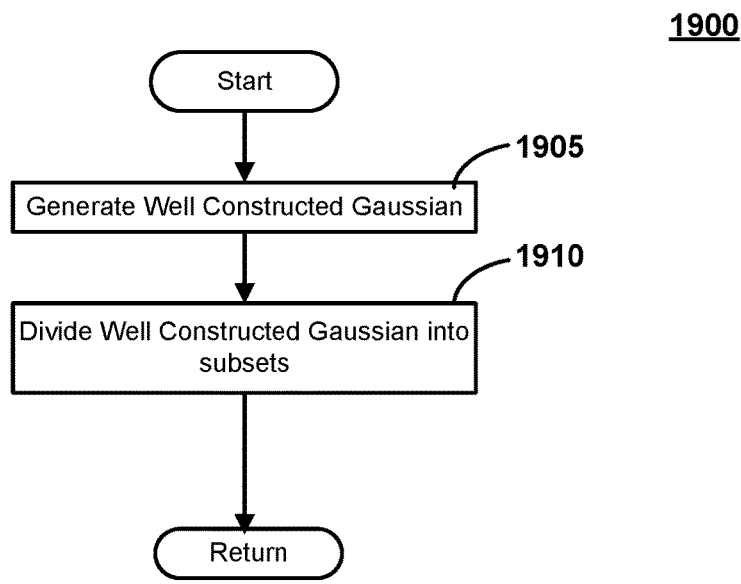
FIG. 19 is a flow diagram illustrating a process for generating two subsets of Well-Constructed Gaussian feature endpoint distributions as may occur in some embodiments.

In some embodiments, it may be helpful to have feature variations readily available to train or test under different conditions without performing the entire process for creating a Well-Constructed Gaussian again. FIG. 18 is a plot illustrating two subsets 1805, 1810 of Gaussian feature endpoint distributions as may be generated in some embodiments. FIG. 19 is a flow diagram illustrating a process for generating two subsets of Gaussian feature endpoint distributions as may occur in some embodiments. At block 1905, a Well-Constructed Gaussian with X times as many points as the number of subsets may be generated using the methods discussed herein. At block 1910, the Well-Constructed Gaussian may be divided into the X subsets. For example, as a feature is described by two offset vectors in some embodiments, two Well-Constructed Gaussians may be generated by taking pairs of offsets (e.g., those associated with a feature) from an initial Well-Constructed Gaussian distribution set and assigning the first point to a first new Well-Constructed Gaussian and the second point to a second new Well-Constructed Gaussian. If the system initially creates twice as many points than desired using the methods described herein, the system may then divide the resulting distribution into two distributions for actual use. In this manner, the second set may neatly fill the gaps between the first set.

In some situations one may wish to generate a larger set from two smaller sets. It may suffice to combine two sets of Well-Constructed Gaussian points to form a larger set, but though the resulting distribution may not be as ideally distributed as if the creation process described herein had been applied to the entire, total set of offsets.

Computer System

Figure 20:
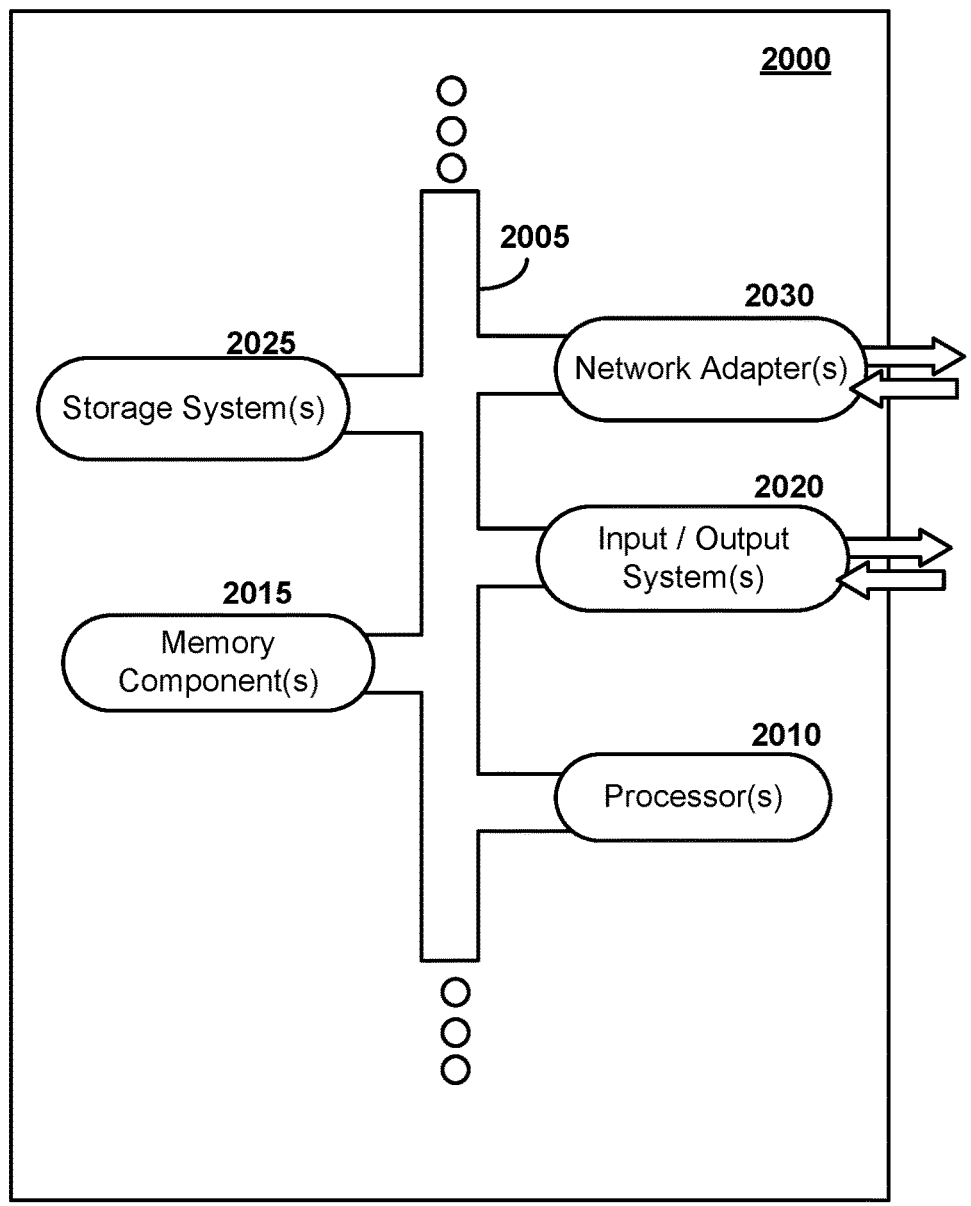
FIG. 20 is a block diagram of an example computer system as may be used in conjunction with some of the embodiments.

FIG. 20 is a block diagram of an example computer system as may be used in conjunction with some of the embodiments. The computing system 2000 may include an interconnect 2005, connecting several components, such as, e.g., one or more processors 2010, one or more memory components 2015, one or more input/output systems 2020, one or more storage systems 2025, one or more network adaptors 2030, etc. The interconnect 2005 may be, e.g., one or more bridges, traces, busses (e.g., an ISA, SCSI, PCI, I2C, Firewire bus, etc.), wires, adapters, or controllers.

The one or more processors 2010 may include, e.g., an Intel™ processor chip, a math coprocessor, a graphics processor, etc. The one or more memory components 2015 may include, e.g., a volatile memory (RAM, SRAM, DRAM, etc.), a non-volatile memory (EPROM, ROM, Flash memory, etc.), or similar devices. The one or more input/output devices 2020 may include, e.g., display devices, keyboards, pointing devices, touchscreen devices, etc. The one or more storage devices 2025 may include, e.g., cloud based storages, removable USB storage, disk drives, etc. In some systems memory components 2015 and storage devices 2025 may be the same components. Network adapters 2030 may include, e.g., wired network interfaces, wireless interfaces, Bluetooth adapters, line-of-sight interfaces, etc.

One will recognize that only some of the components, alternative components, or additional components than those depicted in FIG. 20 may be present in some embodiments. Similarly the components may be combined or serve dual-purposes in some systems. The components may be implemented using special-purpose hardwired circuitry such as, for example, one or more ASICs, PLDs, FPGAs, etc. Thus, some embodiments may be implemented in, for example, programmable circuitry (e.g., one or more microprocessors) programmed with software and/or firmware, or entirely in special-purpose hardwired (non-programmable) circuitry, or in a combination of such forms.

In some embodiments, data structures and message structures may be stored or transmitted via a data transmission medium, e.g., a signal on a communications link, via the network adapters 2030. Transmission may occur across a variety of mediums, e.g., the Internet, a local area network, a wide area network, or a point-to-point dial-up connection, etc. Thus, "computer readable media" can include computer-readable storage media (e.g., "non-transitory" computer-readable media) and computer-readable transmission media.

The one or more memory components 2015 and one or more storage devices 2025 may be computer-readable storage media. In some embodiments, the one or more memory components 2015 or one or more storage devices 2025 may store instructions, which may perform or cause to be performed various of the operations discussed herein. In some embodiments, the instructions stored in memory 2015 can be implemented as software and/or firmware. These instructions may be used to perform operations on the one or more processors 2010 to carry out processes described herein. In some embodiments, such instructions may be provided to the one or more processors 2010 by downloading the instructions from another system, e.g., via network adapter 2030.

Remarks

The above description and drawings are illustrative. Consequently, neither the description nor the drawings should be construed so as to limit the disclosure. For example, titles or subtitles have been provided simply for the reader's convenience and to facilitate understanding. Thus, the titles or subtitles should not be construed so as to limit the scope of the disclosure, e.g., by grouping features which were presented in a particular order or together simply to facilitate understanding. Unless otherwise defined herein, all technical and scientific terms used herein have the same meaning as commonly understood by one of ordinary skill in the art to which this disclosure pertains. In the case of conflict, this document, including any definitions provided herein, will control. A recital of one or more synonyms herein does not exclude the use of other synonyms. The use of examples anywhere in this specification including examples of any term discussed herein is illustrative only, and is not intended to further limit the scope and meaning of the disclosure or of any exemplified term.

Similarly, despite the particular presentation in the figures herein, one skilled in the art will appreciate that actual data structures used to store information may differ from what is shown. For example, the data structures may be organized in a different manner; may contain more or less information than shown; may be compressed and/or encrypted; etc. The drawings and disclosure may omit common or well-known details in order to avoid confusion. Similarly, the figures may depict a particular series of operations to facilitate understanding, which are simply exemplary of a wider class of such collection of operations. Accordingly, one will readily recognize that additional, alternative, or fewer operations may often be used to achieve the same purpose or effect depicted in some of the flow diagrams. For example, data may be encrypted, though not presented as such in the figures, items may be considered in different looping patterns ("for" loop, "while" loop, etc.), or sorted in a different manner, to achieve the same or similar effect, etc.

Reference in this specification to "one embodiment" or "an embodiment" means that a particular feature, structure, or characteristic described in connection with the embodiment is included in at least one embodiment of the disclosure. Consequently, the phrase "in one embodiment" in various places in the specification is not necessarily referring to the same embodiment in each of those various places. Separate or alternative embodiments may not be mutually exclusive of other embodiments. One will recognize that various modifications may be made without deviating from the scope of the embodiments.

I claim:

1. A computer system configured to recognize a user gesture from depth data, the computer system comprising:
   at least one processor;
   at least one memory comprising instructions configured to cause the computer system to perform a method comprising:
      receiving depth data captured while a user performed a gesture;
      applying a template to the depth data to generate a plurality of features; and
      identifying the gesture based upon the plurality of features, wherein
      the template was generated, at least in part, by:
         determining a Gaussian function;
         sampling the Gaussian function to generate a first distribution; and
         generating a second distribution by iteratively sampling the first distribution and selecting points of the first distribution using a metric, wherein selecting points of the first distribution using a metric comprises determining a minimum of a plurality of Sub_Metric values, each Sub_Metric value determined using the formula $$\text{Sub\_Metric}(P, W) = e^{-\left(\frac{P_x + W_x}{2}\right)^2 - \left(\frac{P_y + W_y}{2}\right)^2} \sqrt{(P_x - W_x)^2 + (P_y - W_y)^2},$$

wherein P is a point from the first distribution,
wherein W is a point from the second distribution,
wherein $P_X$ is the X coordinate of the point P from the first distribution,
wherein $P_Y$ is the Y coordinate of the point P from the first distribution,
wherein $W_X$ is the X coordinate of the point W from the second distribution, and
wherein $W_Y$ is the Y coordinate of the point W from the second distribution.

2. The computer system of claim 1, wherein the generated second distribution is a Well-Constructed Gaussian distribution and the template comprises offsets corresponding to the generated second distribution.

3. The computer system of claim 1, wherein the template was generated by the computer system.

4. The computer system of claim 1, wherein the template comprises a plurality of offsets corresponding to the second distribution and wherein identifying the gesture based upon the plurality of features comprises applying the features to a forest.

5. The computer system of claim 1, the method further comprising:
   receiving a plurality of training images; and
   generating a plurality of trees from the training images and the template.

6. The computer system of claim 1, wherein the generated second distribution is a Well-Constructed Gaussian distribution, the template comprises offsets corresponding to the generated second distribution, and wherein identifying the gesture based upon the plurality of features comprises applying the features to a forest generated using the template.

7. The computer system of claim 1, wherein determining a minimum of a plurality of Sub_Metric values for points in the first distribution comprises determining a minimum of Sub_Metric values for a point in the first distribution and each existing point in the second distribution.

8. A computer-implemented method to recognize a user gesture from depth data, the method comprising:
- receiving depth data captured while a user performed a gesture;
- applying a template to the depth data to generate a plurality of features; and
- identifying the gesture based upon the plurality of features, wherein
- the template was generated, at least in part, by:
  - determining a Gaussian function;
  - sampling the Gaussian function to generate a first distribution; and
    - generating a second distribution by iteratively sampling the first distribution and selecting points of the first distribution using a metric, wherein selecting points of the first distribution using a metric comprises determining a minimum of a plurality of Sub_Metric values, each Sub_Metric value determined using the formula $$\text{Sub\_Metric}(P, W) = e^{-\left(\frac{P_x + W_x}{2}\right)^2 - \left(\frac{P_y + W_y}{2}\right)^2} \sqrt{(P_x - W_x)^2 + (P_y - W_y)^2},$$

wherein P is a point from the first distribution,
wherein W is a point from the second distribution,
wherein $P_X$ is the X coordinate of the point P from the first distribution,
wherein $P_Y$ is the Y coordinate of the point P from the first distribution,
wherein $W_X$ is the X coordinate of the point W from the second distribution, and
wherein $W_Y$ is the Y coordinate of the point W from the second distribution.

9. The computer-implemented method of claim 8, wherein the generated second distribution is a Well-Constructed Gaussian distribution and the template comprises offsets corresponding to the generated second distribution.

10. The computer-implemented method of claim 8, wherein the template was generated by the computer.

11. The computer-implemented method of claim 8, wherein the template comprises a plurality of offsets corresponding to the second distribution and wherein identifying the gesture based upon the plurality of features comprises applying the features to a forest.

12. The computer-implemented method of claim 8, the method further comprising:
- receiving a plurality of training images; and
- generating a plurality of trees from the training images and the template.

13. The computer-implemented method of claim 8, wherein the generated second distribution is a Well-Constructed Gaussian distribution, the template comprises offsets corresponding to the generated second distribution, and wherein identifying the gesture based upon the plurality of features comprises applying the features to a forest generated using the template.

14. The computer-implemented method of claim 8, wherein determining a minimum of a plurality of Sub_Metric values for points in the first distribution comprises determining a minimum of Sub_Metric values for a point in the first distribution and each existing point in the second distribution.

15. A non-transitory computer-readable medium comprising instructions configured to cause a computer system to perform a method to recognize a user gesture from depth data, the method comprising:
- receiving depth data captured while a user performed a gesture;
- applying a template to the depth data to generate a plurality of features; and
- identifying the gesture based upon the plurality of features, wherein
- the template was generated, at least in part, by:
  - determining a Gaussian function;
  - sampling the Gaussian function to generate a first distribution; and
    - generating a second distribution by iteratively sampling the first distribution and selecting points of the first distribution using a metric, wherein selecting points of the first distribution using a metric comprises determining a minimum of a plurality of Sub_Metric values, each Sub_Metric value determined using the formula $$\text{Sub\_Metric}(P, W) = e^{-\left(\frac{P_x + W_x}{2}\right)^2 - \left(\frac{P_y + W_y}{2}\right)^2} \sqrt{(P_x - W_x)^2 + (P_y - W_y)^2},$$

wherein P is a point from the first distribution,
wherein W is a point from the second distribution,
wherein $P_X$ is the X coordinate of the point P from the first distribution,
wherein $P_Y$ is the Y coordinate of the point P from the first distribution,
wherein $W_X$ is the X coordinate of the point W from the second distribution, and
wherein $W_Y$ is the Y coordinate of the point W from the second distribution.

16. The non-transitory computer-readable medium of claim 15, wherein the generated second distribution is a Well-Constructed Gaussian distribution and the template comprises offsets corresponding to the generated second distribution.

17. The non-transitory computer-readable medium of claim 15, wherein the template was generated by the computer system.

18. The non-transitory computer-readable medium of claim 15, wherein the template comprises a plurality of offsets corresponding to the second distribution and wherein identifying the gesture based upon the plurality of features comprises applying the features to a forest.

19. The non-transitory computer-readable medium of claim 15, the method further comprising:
- receiving a plurality of training images; and
- generating a plurality of trees from the training images and the template.

20. The non-transitory computer-readable medium of claim 15, wherein determining a minimum of a plurality of Sub_Metric values for points in the first distribution comprises determining a minimum of Sub_Metric values for a point in the first distribution and each existing point in the second distribution.

* * * * *